(12) United States Patent
Chou et al.

(10) Patent No.: US 12,542,871 B2
(45) Date of Patent: Feb. 3, 2026

(54) DATA PROCESSING METHOD AND APPARATUS, DEVICE, AND READABLE STORAGE MEDIUM

(71) Applicant: Tencent Technology (Shenzhen) Company Limited, Shenzhen (CN)

(72) Inventors: Shu-Hui Chou, Shenzhen (CN); Xianmin Xiao, Shenzhen (CN); Shiyu Chen, Shenzhen (CN); Caijun Wang, Shenzhen (CN); Longwu Jiang, Shenzhen (CN); Liqiang Liu, Shenzhen (GD); Qinghua Zhong, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/351,617

(22) Filed: Jul. 13, 2023

(65) Prior Publication Data

US 2023/0362333 A1 Nov. 9, 2023

Related U.S. Application Data

(63) Continuation of application No. PCT/CN2022/111338, filed on Aug. 10, 2022.

(30) Foreign Application Priority Data

Nov. 12, 2021 (CN) .......................... 202111340114.7

(51) Int. Cl.
*G06F 3/048* (2013.01)
*G06F 3/04815* (2022.01)
*H04N 7/15* (2006.01)

(52) U.S. Cl.
CPC ......... *H04N 7/157* (2013.01); *G06F 3/04815* (2013.01)

(58) Field of Classification Search
CPC . H04N 7/157; G06F 3/04815; G06F 3/04845; G06F 21/32; G06F 3/04842;
(Continued)

(56) References Cited

U.S. PATENT DOCUMENTS 7,716,376 B1 * 5/2010 Price .......................... G06F 1/12
709/248
8,612,868 B2 * 12/2013 Cheng ................... G06F 3/0481
715/757

(Continued)

FOREIGN PATENT DOCUMENTS

CN 104205171 A * 12/2014 ............. G06T 11/60
CN 106507021 A * 3/2017
(Continued)

OTHER PUBLICATIONS

International Search Report and Written Opinion in International Patent Application No. PCT/CN2022/111338 dated Nov. 8, 2022, 10 pages.

*Primary Examiner* — Rashawn N Tillery
(74) *Attorney, Agent, or Firm* — Crowell & Moring LLP

(57) ABSTRACT

A data processing method and apparatus, a device, and a readable storage medium are provided. The method includes: performing figure acquisition on a first object in response to a login operation on an application client, and displaying a first virtual object associated with an acquired object figure of the first object (S101); displaying, in a case that a virtual conversation space is entered by using the first virtual object, one or more virtual objects in the virtual conversation space, the one or more virtual objects including the first virtual object, and a space figure of the virtual conversation space being associated with the one or more virtual objects (S102); and displaying a conversation message corresponding to each of the one or more virtual objects in the virtual conversation space (S103). A virtual object in (Continued)

an application is displayed efficiently in a diversified manner, and virtual object display modes are enriched.

19 Claims, 16 Drawing Sheets

(58) Field of Classification Search
CPC .... G06F 3/0481; G06V 10/806; G06V 40/16; G06T 13/40; H04L 51/046
See application file for complete search history.

(56) References Cited

U.S. PATENT DOCUMENTS

| | | | | |
|---|---|---|---|---|
| 11,417,055 | B1* | 8/2022 | Clemens | H04N 13/117 |
| 12,430,672 | B2* | 9/2025 | Borchetta | G06Q 30/0269 |
| 2007/0168863 | A1* | 7/2007 | Blattner | G06F 3/011 |
| | | | | 715/706 |
| 2008/0252637 | A1* | 10/2008 | Berndt | G06T 19/00 |
| | | | | 345/419 |
| 2009/0193123 | A1* | 7/2009 | Mitzlaff | G06F 16/3329 |
| | | | | 709/227 |
| 2009/0249228 | A1* | 10/2009 | Cheng | G06F 3/0481 |
| | | | | 715/758 |
| 2009/0254840 | A1* | 10/2009 | Churchill | H04L 51/04 |
| | | | | 715/753 |
| 2009/0259937 | A1* | 10/2009 | Rohall | G06Q 10/10 |
| | | | | 709/204 |
| 2010/0128103 | A1* | 5/2010 | Sim | H04N 7/148 |
| | | | | 348/14.02 |
| 2011/0004841 | A1* | 1/2011 | Gildred | H04N 1/00453 |
| | | | | 715/780 |
| 2011/0014932 | A1* | 1/2011 | Estevez | G01S 19/14 |
| | | | | 455/466 |
| 2013/0275497 | A1* | 10/2013 | Piao | H04L 67/131 |
| | | | | 709/203 |
| 2014/0118263 | A1* | 5/2014 | Tajima | G06F 9/451 |
| | | | | 345/168 |
| 2014/0325667 | A1* | 10/2014 | Sun | H04L 63/126 |
| | | | | 726/26 |
| 2015/0332387 | A1* | 11/2015 | Stacey | H04L 67/02 |
| | | | | 705/27.2 |
| 2016/0284072 | A1* | 9/2016 | Hsu | G06T 11/60 |
| 2018/0241580 | A1* | 8/2018 | Chen | H04L 12/1818 |
| 2018/0329603 | A1* | 11/2018 | Sawaki | G02B 27/017 |
| 2018/0374275 | A1 | 12/2018 | Inomata et al. | |
| 2019/0260931 | A1* | 8/2019 | Rodriguez | G06T 19/006 |
| 2020/0234481 | A1* | 7/2020 | Scapel | A63F 13/213 |
| 2020/0302668 | A1* | 9/2020 | Guo | G06V 40/176 |
| 2021/0322880 | A1* | 10/2021 | Baszucki | A63F 13/54 |
| 2022/0086203 | A1* | 3/2022 | Morris | H04N 7/157 |
| 2022/0124286 | A1* | 4/2022 | Punwani | H04L 65/1093 |
| 2022/0191157 | A1* | 6/2022 | Lee | H04L 51/063 |
| 2022/0277528 | A1* | 9/2022 | Funazukuri | G06F 3/013 |
| 2022/0321507 | A1* | 10/2022 | Skuratowicz | G06F 3/0481 |
| 2023/0080905 | A1* | 3/2023 | Tomczek | G06F 3/016 |
| | | | | 345/156 |
| 2023/0094963 | A1* | 3/2023 | Lin | H04N 7/147 |
| | | | | 348/14.09 |
| 2023/0328012 | A1* | 10/2023 | Sha | H04L 51/063 |
| 2023/0364800 | A1* | 11/2023 | Khosla | B25J 13/003 |

FOREIGN PATENT DOCUMENTS

| | | | | |
|---|---|---|---|---|
| CN | 107958422 A | * | 4/2018 | |
| CN | 108279776 A | * | 7/2018 | |
| CN | 108876878 A | * | 11/2018 | G06T 13/40 |
| CN | 109146702 A | * | 1/2019 | |
| CN | 109150690 A | * | 1/2019 | G06K 9/00302 |
| CN | 110036412 A | * | 7/2019 | G06K 9/00308 |
| CN | 110210449 A | * | 9/2019 | G06F 3/012 |
| CN | 106844061 B | * | 2/2020 | G06F 9/543 |
| CN | 110765335 A | * | 2/2020 | G06F 16/951 |
| CN | 112364971 A | | 2/2021 | |
| CN | 112750186 A | | 5/2021 | |
| CN | 113014471 A | | 6/2021 | |
| JP | 2009223419 A | * | 10/2009 | |
| KR | 20060062615 A | * | 6/2006 | |
| TW | 202036263 A | * | 10/2020 | G06F 3/011 |
| WO | WO-2009039740 A1 | * | 4/2009 | H04L 12/581 |
| WO | WO-2020020068 A1 | * | 1/2020 | G06F 16/9577 |
| WO | WO-2020085718 A1 | * | 4/2020 | G06T 11/001 |
| WO | WO 2021/185375 A1 | | 9/2021 | |
| WO | WO-2022083554 A1 | * | 4/2022 | G06F 16/9535 |

* cited by examiner

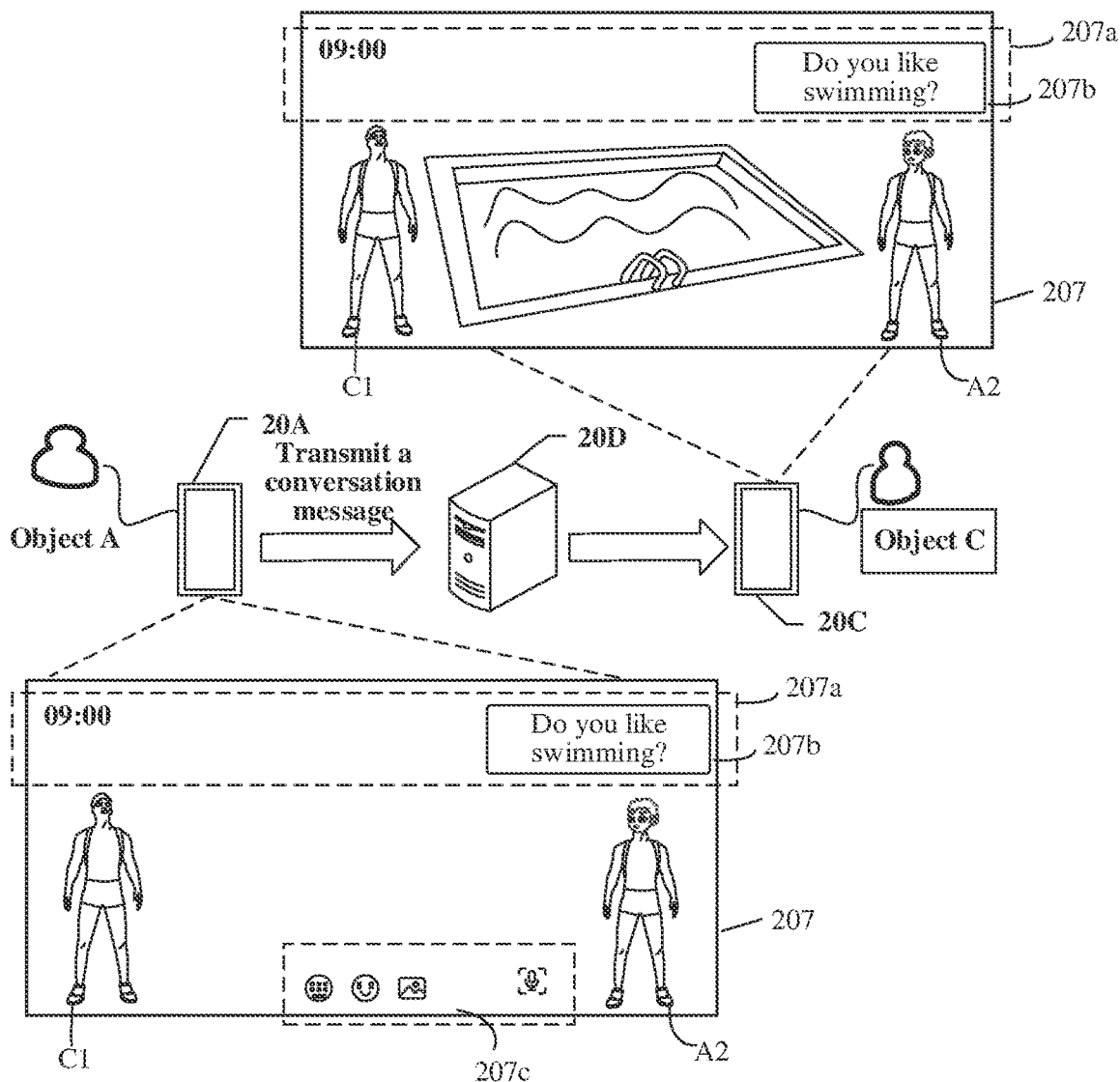

FIG. 6

| | |
|---|---|
| Perform figure acquisition on a first object in response to a login operation on an application client, and display a first virtual object associated with an acquired object figure of the first object | S101 |
| Display, in a case that a virtual conversation space is entered by using the first virtual object, one or more virtual objects in the virtual conversation space, the one or more virtual objects including the first virtual object, and a space figure of the virtual conversation space being associated with the one or more virtual objects | S102 |
| Display a conversation message corresponding to each of the one or more virtual objects in the virtual conversation space | S103 |

FIG. 7

DATA PROCESSING METHOD AND APPARATUS, DEVICE, AND READABLE STORAGE MEDIUM

RELATED APPLICATION

This application is a continuation application of the International PCT Application No. PCT/CN2022/111338, filed with the China National Intellectual Property Administration, PRC on Aug. 10, 2022, which claims priority to Chinese Patent Application No. 202111340114.7, filed with the China National Intellectual Property Administration, PRC on Nov. 12, 2021, each of which is incorporated by reference in its entirety.

FIELD OF THE TECHNOLOGY

This application relates to the field of Internet technologies, and in particular, to a data processing method and apparatus, a device, and a readable storage medium.

BACKGROUND OF THE DISCLOSURE

With constant development of an Internet technology, more and more objects tend to communicate with others by using applications with an instant conversation function. In an instant conversation, an object may transmit various multimedia data as required, for example, a text, an image, a voice, or a video, thereby implementing information exchange and propagation.

In an existing social application, an instant conversation may be implemented between objects by using virtual objects respectively corresponding to the objects (for example, the virtual object may be avatar data in the instant conversation). Generally, in the existing social application, a picture is uploaded, and then a virtual object is generated based on the picture. However, a display mode of the virtual object is fixed and single. If the virtual object is to be changed, another picture is required to be uploaded, and then a new virtual object is generated based on the re-uploaded picture. It can be seen that new pictures are required to be continuously uploaded to ensure more diversified displaying of the virtual object. As a result, the virtual object cannot be efficiently displayed in a diversified manner.

SUMMARY

Embodiments of this disclosure provide a data processing method and apparatus, a device, and a readable storage medium. A virtual object in an application may be displayed efficiently in a diversified manner, and virtual object display modes are enriched.

An aspect of the embodiments of this disclosure provides a data processing method, performed by a computer device and including:

performing figure acquisition on a first object in response to a login operation on an application client, and displaying a first virtual object associated with an acquired object figure of the first object;

displaying, in a case that a virtual conversation space is entered by using the first virtual object, one or more virtual objects in the virtual conversation space, the one or more virtual objects including the first virtual object, and a space figure of the virtual conversation space being associated with the one or more virtual objects; and displaying a conversation message corresponding to each of the one or more virtual objects in the virtual conversation space.

An aspect of the embodiments of this disclosure provides a data processing apparatus, including:

a first display module, configured to perform figure acquisition on a first object in response to a login operation on an application client, and display a first virtual object associated with an acquired object figure of the first object;

a second display module, configured to display one or more virtual objects in a virtual conversation space in a case that the virtual conversation space is entered by using the first virtual object, the one or more virtual objects including the first virtual object, and a space figure of the virtual conversation space being associated with the one or more virtual objects; and a third display module, configured to display a conversation message corresponding to each of the one or more virtual objects in the virtual conversation space.

An aspect of the embodiments of this disclosure provides a computer device, including a processor, a memory, and a network interface.

The processor is connected to the memory and the network interface. The network interface is configured to provide a data communication network element. The memory is configured to store program code. The processor is configured to invoke the program code to perform the method in the embodiments of this disclosure.

An aspect of the embodiments of this disclosure provides a computer-readable storage medium. The computer-readable storage medium stores a computer program. The computer program is suitable for a processor to load and execute to implement the method in the embodiments of this disclosure.

An aspect of the embodiments of this disclosure provides a computer program product or computer program. The computer program product or computer program includes computer instructions. The computer instructions are stored in a computer-readable storage medium. A processor of a computer device reads the computer instructions from the computer-readable storage medium. The processor executes the computer instructions to enable the computer device to perform the method in the embodiments of this disclosure.

In this embodiment of this disclosure, when a first object logs in to a social application, figure acquisition may be performed on the first object in response to a login operation on a conversation function in the social application, and a first virtual object associated with an acquired object figure of the first object and the conversation function is displayed. In a case that a virtual conversation space associated with the conversation function is entered by using the first virtual object, one or more virtual objects are displayed in the virtual conversation space, and a conversation message corresponding to each of the one or more virtual objects is displayed in the virtual conversation space. The one or more virtual objects include the first virtual object. A space figure of the virtual conversation space is associated with the one or more virtual objects. It can be seen that in each login to the social application, the first virtual object corresponding to the first object is associated with an object figure of the first object for login to the social application, so that virtuality of the first virtual object is improved. The object figure for each login may differ to some extent, so that the first virtual object generated each time is more diversified, and display modes of the first virtual object are enriched. The first virtual object may be generated by performing figure acquisition on the first object, so that efficiency of generating the first virtual object is improved. In addition, the space figure of the virtual conversation space is associated with the one or more virtual objects including the first virtual object, so that space figures of virtual conversation spaces corresponding to different virtual objects are more diversified, and display modes of an instant conversation are enriched.

BRIEF DESCRIPTION OF THE DRAWINGS

FIG. 6 is a schematic diagram of an instant conversation scene under a chat-with-strangers function according to an embodiment of this disclosure.

FIG. 7 is a schematic flowchart of a data processing method according to an embodiment of this disclosure.

DESCRIPTION OF EMBODIMENTS

Figure 1:
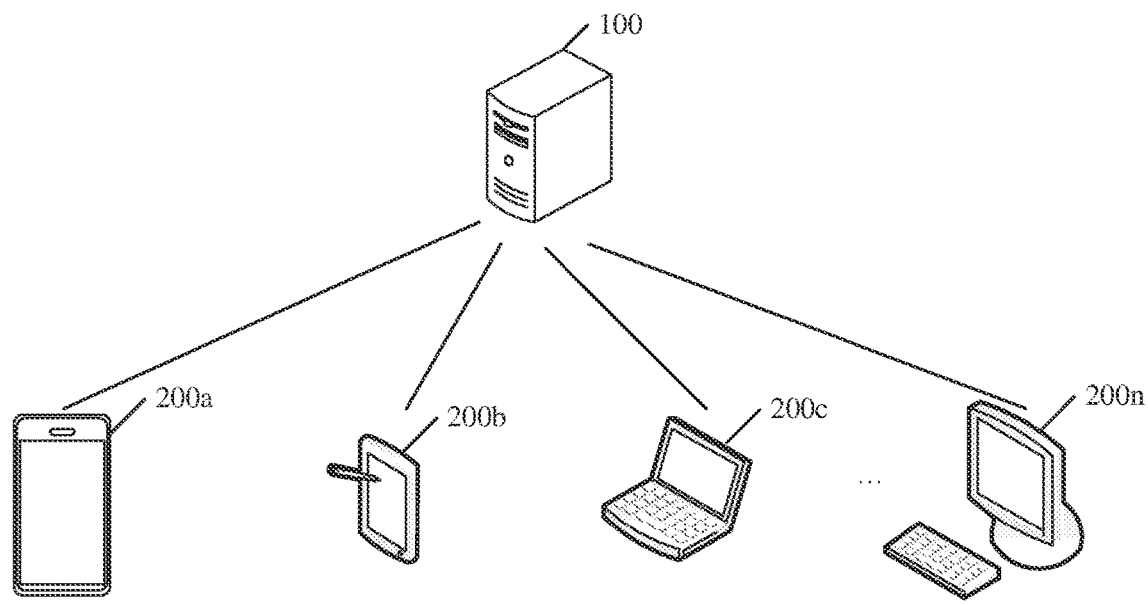
FIG. 1 is a schematic diagram of a network architecture according to an embodiment of this disclosure.

The following clearly and completely describes the technical solutions in the embodiments of this disclosure with reference to the accompanying drawings in the embodiments of this disclosure. Clearly, the described embodiments are merely some but not all of the embodiments of this disclosure. All other embodiments obtained by a person of ordinary skill in the art based on the embodiments of this disclosure without creative efforts shall fall within the protection scope of this application.

Artificial Intelligence (AI) is a theory, method, technology and application system of simulating, extending and developing human intelligence using digital computers or machines controlled by digital computers to perceive environments, acquire knowledge, and obtain optimal results using the knowledge. In other words, AI is a comprehensive technology in computer science and attempts to understand the essence of intelligence and produce a new intelligent machine capable of reacting in a manner similar to human intelligence. AI is to study design principles and implementation methods of various intelligent machines, to endow the machines with functions of perception, reasoning, and decision-making.

The AI technology is a comprehensive discipline, and relates to a wide range of fields including both hardware-level technologies and software-level technologies. Basic AI technologies generally include technologies such as a sensor, a dedicated AI chip, cloud computing, distributed storage, a big data processing technology, an operating/interaction system, and electromechanical integration. AI software technologies mainly include several major directions, for example, a computer vision (CV) technology, a voice processing technology, a natural language processing technology, and machine learning/deep learning.

The CV technology is a science that studies how to use a machine to "see", and furthermore, that performs machine vision processing such as recognition and measurement on a target by using a camera and a computer instead of human eyes and further performs graphic processing, so that the computer processes the target into an image more suitable for human eyes to observe or an image transmitted to an instrument for detection. As a scientific discipline, CV studies related theories and technologies and attempts to establish an AI system that can obtain information from images or multidimensional data. CV usually includes image processing, image recognition, semantic image understanding, image retrieval, optical character recognition (OCR), video processing, semantic video understanding, video content/behavior recognition, three-dimensional (3D) object reconstruction, a 3D technology, virtual reality, augmented reality, simultaneous localization and mapping, and other technologies, and also includes common biometric feature recognition technologies such as face recognition and fingerprint recognition.

The solutions provided in the embodiments of this disclosure relate to the CV technology and other technologies in AI, and are specifically described by using the following embodiments.

Refer to FIG. 1. FIG. 1 is a schematic diagram of a network architecture according to an embodiment of this disclosure. As shown in FIG. 1, the network architecture may include a server 100 and a terminal cluster. The terminal cluster may include a user terminal 200a, a user terminal 200b, a user terminal 200c, . . . , and a user terminal 200n. There may be a communication connection between the user terminals in the terminal cluster. For example, there is a communication connection between the user terminal 200a and the user terminal 200b, and there is a communication connection between the user terminal 200a and the user terminal 200c. In addition, there may be a communication connection between any user terminal in the terminal cluster and the server 100. For example, there is a communication connection between the user terminal 200a and the server 100. A connection manner for the communication connection is not limited. Wired communication may be used for direct or indirect connection, wireless communication may be used for direct or indirect connection, or another manner may be used. This is not limited herein in this application.

It is to be understood that an application client may be installed in each user terminal in the terminal cluster shown in FIG. 1, and when run in each user terminal, the application client may perform data interaction with the server 100 shown in FIG. 1. The application client may be an application client with an instant conversation function, for example, an instant messaging application, a social application, a livestreaming application, a short video application, a video application, a music application, a shopping application, a game application, a novel application, a payment application, or a browser. The application client may be an independent client, or an embedded subclient integrated into a specific client (for example, a social client or a game client). This is not limited herein. An instant conversation herein may also be referred to as instant messaging and instant chatting, is a system service for real-time communication on the Internet, and may support real-time transmission of an information flow, for example, a text, a voice, a video, an image, or a document. A social application is used as an example. The server 100 may include a plurality of servers corresponding to the social application, for example, a background server and a data processing server. Therefore, each user terminal may perform data transmission with the server 100 by using an application client corresponding to the social application. For example, each user terminal may conduct an instant conversation with another user terminal through the server 100, for communication and sharing anytime anywhere. For example, instant messaging may be performed between different user terminals in a form of transmitting and receiving conversation messages.

For ease of understanding, the user terminal 200a and the user terminal 200b are used as an example. The user terminal 200a may generate a conversation message A by using the social application installed in the user terminal 200a, and further transmit the conversation message A to the server 100. Then, the user terminal 200b may receive the conversation message A through the server 100, and display the conversation message A in a virtual conversation space corresponding to the user terminal 200b. Similarly, the user terminal 200b may transmit a conversation message B through the server 100 by using the social application installed in the user terminal 200b. In this way, the instant conversation between the user terminal 200a and the user terminal 200b is implemented.

The conversation message may include one or more message types, for example, a text message, a voice message, a sticker message, a picture message (which may include a static picture and a dynamic picture), a link message, an applet message, a video message, a file message, and a virtual item message (which may be used for sending and receiving a virtual item, for example, a virtual gift or a virtual red packet). A specific type of the conversation message is not limited in the embodiments of this disclosure.

It may be understood that a method provided in the embodiments of this disclosure may be performed by a computer device. The computer device includes but is not limited to a user terminal or a server. The server may be an independent physical server, or a server cluster or distributed system including a plurality of physical servers, or a cloud server providing a basic cloud computing service such as a cloud database, a cloud service, cloud computing, a cloud function, cloud storage, a network service, cloud communication, a middleware service, a domain name service, a security service, a content delivery network (CDN), or a big data and AI platform. The user terminal may be an intelligent terminal capable of running the application client with the instant conversation function, for example, a smartphone, a tablet computer, a laptop computer, a desktop computer, a palmtop computer, a mobile Internet device (MID), a wearable device (for example, a smartwatch or a smart band), an intelligent computer, or an intelligent in-vehicle terminal. The user terminal may be directly or indirectly connected to the server in a wired or wireless manner. This is not limited herein in the embodiments of this disclosure.

It is to be noted that the user terminal may provide a virtual conversation space for an object to transmit and receive a conversation message, and in addition, may display, in the virtual conversation space, a virtual object that is associated with an object figure of the object and a conversation function corresponding to the virtual conversation space, to make the object feel present in a real conversation. the virtual conversation space may simulate, for example, a real life environment, such as an office, a gym, a restaurant, an athletic field, etc. The object herein may include a user participating in the instant conversation (for example, a user A and a user B). A quantity of objects participating in a same instant conversation may be one or more. A specific quantity of objects is not limited in the embodiments of this disclosure. For ease of understanding and describing subsequent content, in the embodiments of this disclosure, the objects participating in the same instant conversation include a first object (for example, an object A) and a second object (for example, an object B). The first object may be a conversation message transmitter (which may also be referred to as a transmission object) or a conversation message receiver (which may also be referred to as a receiving object). Similarly, the second object may be a conversation message transmitter or a conversation message receiver. This is not limited in the embodiments of this disclosure. The object figure may include a facial feature (which may also be referred to as a feature, facial characteristic) and an appearance feature of the object. The facial feature includes the five sense organs of the object. The appearance feature includes an appearance, a hair style, a body shape, clothing, and the like of the object. The object figure may be obtained by shooting an object image of the object, for example, by using a camera of the terminal. The virtual conversation space is a virtual environment that the virtual object is currently in, for example, a virtual room, a virtual bar, a virtual party, or a virtual amusement park. It is to be understood that the object may appear as the virtual object in a virtual social scene. Therefore, in the embodiments of this disclosure, a virtual object of the first object (e.g., first person) is referred to as a first virtual object, and a virtual object of the second object is referred to as a second virtual object. The virtual social scene may include, for example, a 3-D virtual space, such as a future-Internet-based 3D virtual space that presents features of convergence and physical persistence by using virtual augmented physical reality and that has link perception and sharing features, or an interactive, immersive, and collaborative world. Just as the physical universe is a series of spatially interconnected worlds, the virtual social scene may be considered as a collection of worlds.

Specifically, the embodiments of this disclosure provide a virtual object-based instant conversation design. In a process in which the first object logs in to an application client with an instant conversation function, the user terminal may perform figure acquisition on the first object in response to a login operation on the conversation function in the application client, display the first virtual object associated with an acquired object figure of the first object and the conversation function, further display, when entering, by using the first virtual object, a virtual conversation space associated with the conversation function, one or more virtual objects in the virtual conversation space, and display a conversation message corresponding to each of the one or more virtual objects in the virtual conversation space. The conversation function may include a first conversation function and a second conversation function. The first conversation function may include a function for an instant conversation with an object in association with the first object, for example, a chat-with-friends function. The second conversation function may include a conversation function for an instant conversation with an object not in association with the first object, for example, a chat-with-strangers function. It is to be understood that different conversation functions correspond to different social scenes, and the object chats with different object groups. Therefore, when different conversation functions are selected, the object may correspond to different virtual objects. That is, the object may chat with different object groups by using different virtual objects. A space figure of the virtual conversation space is associated with the one or more virtual objects displayed in the virtual conversation space. The space figure is used for indicating a visual presentation mode of the virtual conversation space. It can be seen that in the embodiments of this disclosure, every time when the object logs in to the application client with the instant conversation function, the corresponding virtual object may have a different figure feature, and the virtual object is generated according to the conversation function selected by the object and a current object figure of the object. This considers that a situation of the object in the social scene is closer to a real life situation of the object, and improves presence of the object in the instant conversation. In addition, to enrich display modes of the instant conversation scene, the space figure (e.g., the theme of the space) corresponding to the virtual conversation space in the instant conversation of the object is also associated with the figure feature of the virtual object corresponding to the object. The figure feature of the virtual object may include figure body shape information (for example, "large head and small body"), figure style information (for example, "cute", "smart", or "conservative"), and figure color information (for example, "blue (hair)-white (coat)-black (skirt)") of the virtual object.

For ease of understanding, refer to FIG. 2 to FIG. 6 together. FIG. 2 to FIG. 6 are schematic diagrams of a virtual object-based application scene according to embodiments of this disclosure. An implementation process of the application processing scene may be performed in the server 100 shown in FIG. 1, may be performed in a user terminal, or may be performed by both a user terminal and a server. This is not limited herein. In the embodiments of this disclosure, an example in which a user terminal 20A, a user terminal 20B, a user terminal 20C, and a server 20D interact is used for description. The user terminal 20A herein may be any user terminal, for example, the user terminal 200a, in the terminal cluster shown in FIG. 1. The user terminal 20B may also be any user terminal, for example, the user terminal 200b, in the terminal cluster shown in FIG. 1. The user terminal 20C may also be any user terminal, for example, the user terminal 200c, in the terminal cluster shown in FIG. 1. The server 20D may be the server 100 shown in FIG. 1.

As shown in FIG. 2 to FIG. 6, the object A has a binding relationship with the user terminal 20A. The object B has a binding relationship with the user terminal 20B. An object C has a binding relationship with the user terminal 20C. In the embodiments of this disclosure, according to a social requirement of the object, the conversation function provided by the application client may include the chat-with-friends function (that is, the foregoing first conversation function) and the chat-with-strangers function (that is, the foregoing second conversation function). If the object A and the object B have a friend relationship in the application client, the object A and the object B may conduct an instant conversation by using the chat-with-friends function provided by the application client in the user terminals respectively bound with the object A and the object B. In this case, the object A and the object B are both sides of the instant conversation. The object A may be the first object, and the object B may be the second object. It is assumed that the object A and the object C do not know each other, but the object A and the object C may conduct an instant conversation by using the chat-with-strangers function provided by the application client in the user terminals respectively bound with the object A and the object C. In this case, the object A and the object C are both sides of the instant conversation. The object A may be the first object, and the object C may be the second object. For ease of understanding and distinguishing, in the embodiments of this disclosure, a user terminal corresponding to the first object may be referred to as a first terminal (for example, the user terminal 20A), and a user terminal corresponding to the second object may be referred to as a second terminal (for example, the user terminal 20B or the user terminal 20C). It is to be understood that both the first terminal and the second terminal may transmit and receive conversation messages. Therefore, in the embodiments of this disclosure, when the first terminal transmits a conversation message to the second terminal, the first terminal is a transmission terminal, and the second terminal is a receiving terminal. When the second terminal transmits a conversation message to the first terminal, the second terminal is a transmission terminal, and the first terminal is a receiving terminal.

It is to be understood that a process in which the user terminal 20A transmits a conversation message to the user terminal 20B or the user terminal 20C is the same as a process in which the user terminal 20B or the user terminal 20C transmits a conversation message to the user terminal 20A. In the embodiments of this disclosure, an example in which the user terminal 20A is a transmission terminal and the user terminal 20B or the user terminal 20C is a receiving terminal is merely used for description.

Figure 2:
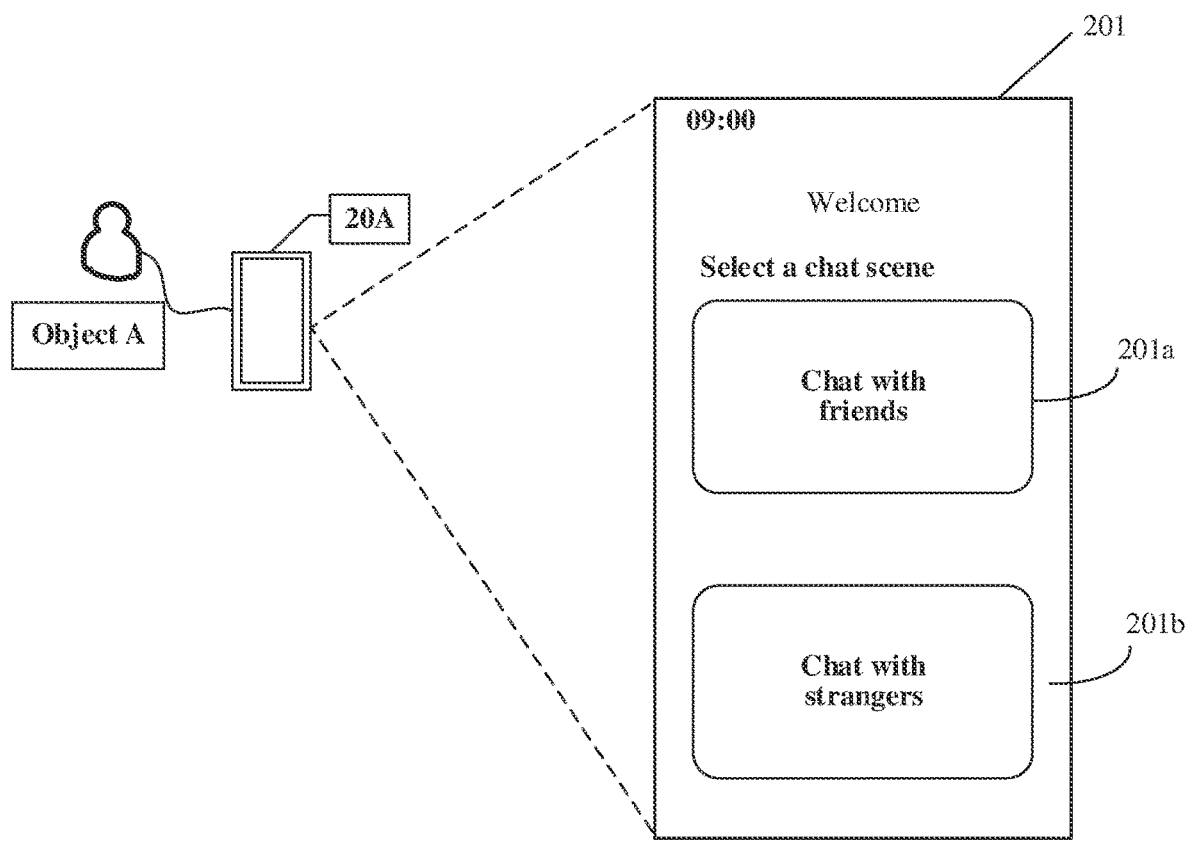
FIG. 2 is a schematic diagram of a conversation function selection interface according to an embodiment of this disclosure.

Specifically, refer to FIG. 2. FIG. 2 is a schematic diagram of a conversation function selection interface according to an embodiment of this disclosure. When the object selects different conversation functions for login, different virtual object generation manners are used for the object, different virtual objects are finally obtained, and the object may conduct instant conversations with different object groups by using different virtual objects. As shown in FIG. 2, after opening the application client installed in the user terminal 20A, the user terminal 20A (that is, the first terminal) may first display a conversation function selection interface 201 of the application client. The conversation function selection interface 201 may include function controls for different conversation functions, that is, a chat-with-friends control

201*a* and a chat-with-strangers control 201*b*. The user terminal 20A may perform figure acquisition on the object A in response to login operations performed by the object A on different conversation functions, and then display first virtual objects associated with object figures of the object A and the conversation functions selected by the object A.

Figure 3:
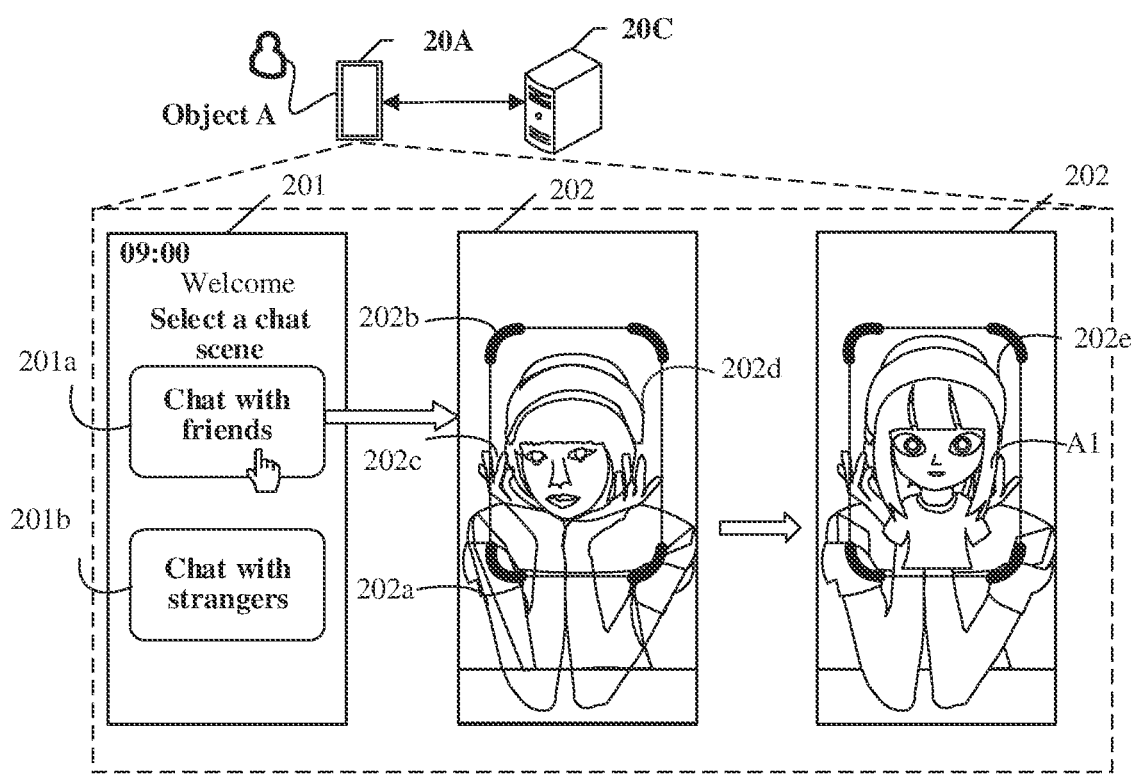
FIG. 3 is a schematic diagram of a virtual object generation scene under a chat-with-friends function according to an embodiment of this disclosure.

If intending to use the chat-with-friends function, the object A may perform a login operation on the chat-with-friends function. For example, the object A may tap the chat-with-friends control 201*a*. For ease of understanding, refer to FIG. 3 together. FIG. 3 is a schematic diagram of a virtual object generation scene under the chat-with-friends function according to an embodiment of this disclosure. As shown in FIG. 3, the user terminal 20A displays a login interface 202 in response to a trigger operation on the chat-with-friends control 201*a* on the conversation function selection interface 201. Then, the user terminal 20A may shoot the object A (taking a picture for object A) by using a camera, and then display a shot image 202*a* on the login interface 202. The login interface 202 further includes a shot picture display region 202*b* (also referred to as a camera display area). When an object image 202*c* of the object A is displayed in the shot picture display region 202*b*, the user terminal 20A may perform recognition and detection on the object image 202*c* (the object image 202*c* is a partial image, falling in the shot picture display region 202*b*, of the image 202*a*) of the object A in the shot picture display region 202*b*. It is to be understood that the object image 202*c* is required to include a key part image of the object A, that is, an entire head image of the object A. The user terminal 20A performs recognition and detection on the object image 202*c*, and when determining that the object image 202*c* satisfies a login condition, may extract object figure data (for example, a hair style, a facial form, or the five sense organs) of the object A, and then generate a virtual object (that is, a first virtual object, for example, a virtual object A1) corresponding to the object A under the chat-with-friends function based on the object figure data. It is to be understood that before extracting the object figure data of the object A, the user terminal 20A may first display a message prompt box to inform the object A that the user terminal 20A is required to obtain the object figure data of the object A, and when the object A performs a trigger operation on an agreeing control in the message prompt box, confirm that a permission of the object A is obtained, and then start to extract the object figure data of the object A. The virtual object may be generated by the user terminal 20A based on the object figure data. Alternatively, the virtual object may be generated by the server 20D based on the object figure data after the user terminal 20A transmits the object figure data to the server 20D, and then the user terminal 20A receives rendered data transmitted by the server 20D to display the virtual object. Then, the user terminal 20A may display the virtual object A1 in the shot picture display region 202*b*. The virtual object herein may be diversified, which may be a two-dimensional (2D) virtual object or a 3D virtual object, or may be a static virtual object or a dynamic virtual object. However, a virtual object figure (for example, a hair style, a facial form, or the five sense organs) of the virtual object A1 is matched with an object figure of the object A. In brief, the virtual object A1 is highly similar to the object A. For example, as shown in FIG. 3, it can be seen from the object image 202*c* of the object A that the object A is in a hat 202*d*, and the virtual object A1 displayed in the shot picture display region 202*b* is in a hat 202*e*. It is to be understood that a style, a color, a material, or the like of the hat 202*e* is highly similar to that of the hat 202*d*. Therefore, mapping of a real figure to the virtual figure is implemented. As shown in FIG. 3, an original image is first taken for real object (such as a person), then a virtual image of a virtual object corresponding to the real object is generated. The virtual image keeps key features of the original image.

It is to be noted that due to different shooting ranges in an actual shooting process, the object image displayed in the shot picture display region may not cover an entire image of the object A. For example, the object image 202*c* covers only a part image of the object A above the shoulders and the neck. In this case, when the user terminal 20A performs recognition and detection on the object image 202*c*, partial object figure data (for example, tops, bottoms, or shoes) pf the object A cannot be extracted. However, the virtual object A1 is required to be a complete virtual object. In this case, a virtual object corresponding to the object figure data that cannot be extracted may be matched for the virtual object A1 based on a feature (for example, a hair style and color or an appearance style) of object figure data extracted by the user terminal 20A. In addition, in the shot picture display region 202*b*, a complete virtual figure of the virtual object A1 may be displayed, or only a partial virtual figure matched with the object image 202*c* may be displayed. For example, the object image 202*c* covers only an upper body of the object A, and the user terminal 20A displays only an upper body of the virtual object A1 in the shot picture display region 202*b*.

Figure 4:
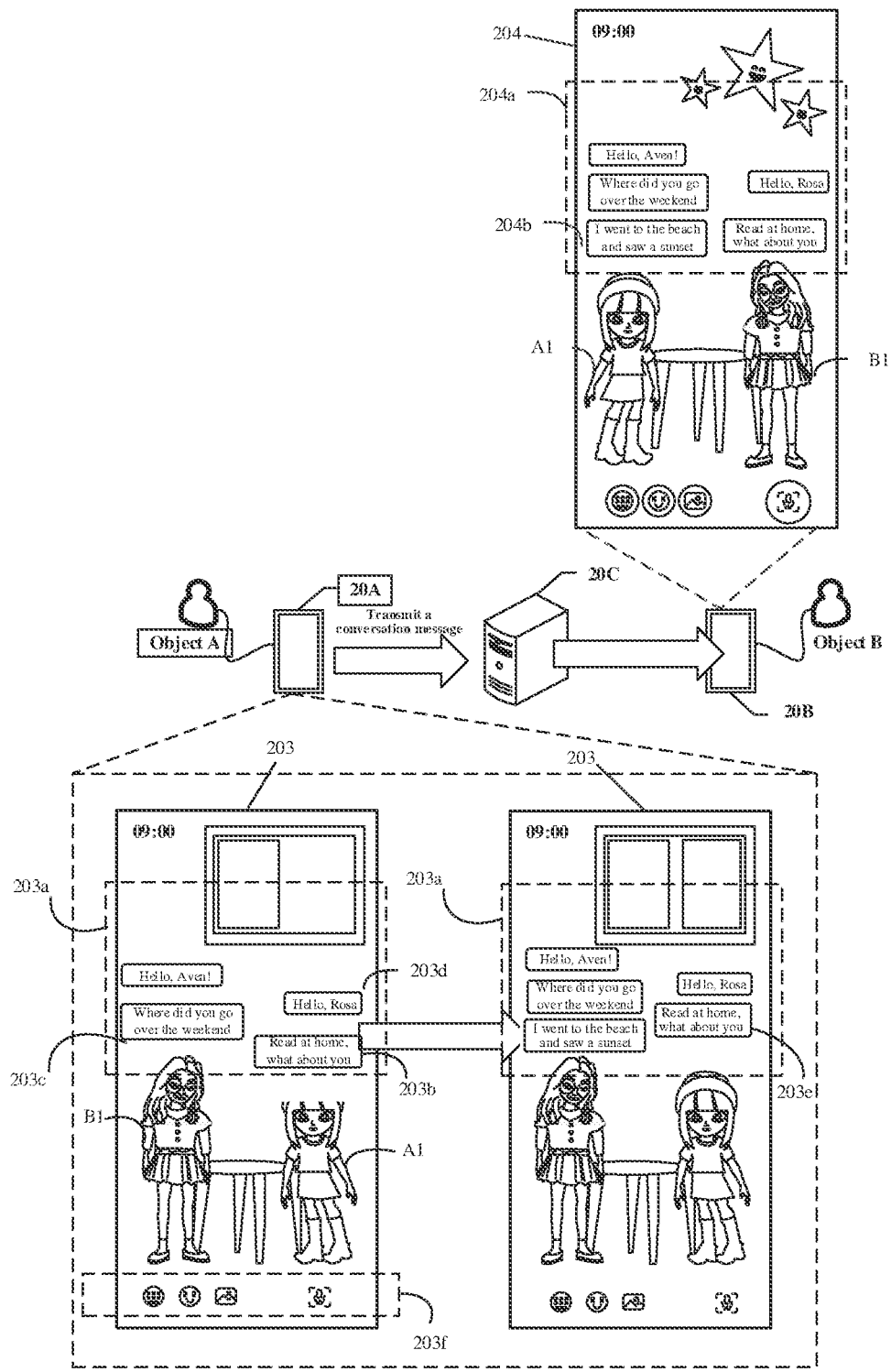
FIG. 4 is a schematic diagram of an instant conversation scene under a friend relationship according to an embodiment of this disclosure.

Further, the object A may conduct the instant conversation with the object B by using the virtual object A1. Refer to FIG. 4 together. FIG. 4 is a schematic diagram of an instant conversation scene under a friend relationship (friend chatting function) according to an embodiment of this disclosure. Under the friend chatting function, the virtual conversation space may be a virtual room corresponding to each object. When intending to conduct an instant conversation with the object B, a friend of the object A, the object A may enter a virtual room corresponding to the object B by using the virtual object A1. It is to be understood that, to enhance immersion of the object in the instant conversation, a space figure of the virtual room corresponding to the object may be associated with the virtual object corresponding to the object. That is, when the figure feature of the virtual object generated every time when the object logs in to the application client, the virtual room corresponding to the object may change with the figure feature of the virtual object. As shown in FIG. 4, the user terminal 20A may display a virtual room 203 corresponding to the object B in response to a selection operation of entering the virtual room 203 corresponding to the object B. The virtual object A1 and a virtual object B1 that corresponds to the object B are displayed in the virtual room 203. It is to be understood that a virtual object figure of the virtual object B1 and an object figure of the object B are associated, that is, highly similar in appearance. The virtual object B1 may be generated when the object B logs in to the application client by using the user terminal 20B. For a specific generation process, refer to a generation process of the virtual object A1 in FIG. 3, and elaborations are omitted herein. As shown in FIG. 4, the virtual room 203 is a virtual room corresponding to the virtual object B1. Therefore, a space figure of the virtual room 203 is matched with a figure feature of the virtual object B1. For example, a decoration style of the virtual room 203 may be matched with a figure style of the virtual object B1. The figure style of the virtual object B1 is mature and elegant, and the decoration style of the virtual room 203 is also mature and elegant. An overall color of the virtual room 203 may be matched with a figure color of the virtual object B1. For example, the figure color of the virtual object B1 is light gray, and the overall color of the virtual room 203 is also light gray (the color is not shown in the figure). Optionally, the space figure of the virtual room 203 may consider a figure feature of the virtual object A1, that is, comprehensive figure features of the virtual object A1 and the virtual object B1 are matched.

As shown in FIG. 4, the virtual room 203 may further include a message display region 203a. Conversation messages generated in the instant conversation between the object A and the object B may be displayed in the message display region 203a. Optionally, one conversation message may be displayed in one conversation display box. For example, a conversation message "Where did you go over the weekend" transmitted by the object A is displayed in a conversation display box 203b, and a conversation message "Reading at home, what about you" transmitted by the object B is displayed in a conversation display box 203c. A background topic of a conversation display box corresponding to a conversation message transmitted by an object is matched with a figure feature of a virtual object corresponding to the same object. For example, a background color of the conversation display box 203b is matched with a figure color of the virtual object A1, and a background color of the conversation display box 203c is matched with the figure color of the virtual object B1. Optionally, conversation display boxes corresponding to conversation messages transmitted by a same object are sequentially located above a virtual object corresponding to the object, and a conversation message with an early transmission timestamp may be displayed above a conversation message with a late transmission timestamp. The conversation display box may also be displayed in a transparency gradient manner, and a conversation message transmitted earlier corresponds to a higher transparency. For example, a transparency of a conversation display box 203d corresponding to a conversation message "Hello, Aven" first transmitted by the object A may be 30%, and a transparency of the conversation display box 203b is 0. Optionally, when display duration of a conversation display box reaches duration of a display life cycle, displaying of the conversation display box and a conversation message in the conversation display box is canceled. Optionally, when a quantity of conversation display boxes corresponding to a same object reaches a display threshold, displaying of a conversation message with an earliest transmission timestamp and a conversation display box corresponding to the conversation message is canceled.

Further, the user terminal 20A may generate, in response to a trigger operation on the virtual room 203, a conversation message (for example, "I went to the beach and saw a sunset") for transmission to the object B, and display the conversation message in a conversation display box 203e in the message display region 203a of the virtual room 203. The virtual room 203 may further include a message entry control bar 203f. The message entry control bar 203f may include one or more message entry controls, for example, a text entry control, a status display control, and a voice control. Corresponding information may be input by using the message entry controls, thereby generating a conversation message required to be transmitted. For example, text information (for example, text information "OK") may be input by using the text entry control. For another example, image data required to be transmitted (for example, a sticker) may be selected by using the status display control. Optionally, a conversation message may be generated in a non-control manner. For example, historical image data (for example, a used sticker) displayed on a conversation interface is used as a conversation message required to be transmitted. A generation manner for the conversation message is not limited in the embodiments of this disclosure. In addition, the user terminal 20A may transmit a conversation message input by the object A to the server 20D. After receiving the conversation message, the server 20D forwards the conversation message to the user terminal 20B (that is, the second terminal). The user terminal 20B may also display the conversation message in a corresponding virtual conversation space.

The virtual conversation space displayed in the user terminal 20B may be the virtual room 203 displayed in the user terminal 20A, or may be different from the virtual room 203 displayed in the user terminal 20A. As shown in FIG. 4, the virtual conversation space displayed in the instant conversation between the object B and the object A may be a virtual room 204 corresponding to the object A. A space figure of the virtual room 204 is matched with the figure feature of the virtual object A1. For example, a decoration style of the virtual room 204 may be matched with a figure style of the virtual object A1. The figure style of the virtual object A1 is cute, and the decoration style of the virtual room 203 is also cute. An overall color of the virtual room 204 may be matched with the figure color of the virtual object A1. The figure color of the virtual object A1 is dark gray, and the overall color of the virtual room 204 is also dark gray. The user terminal 20B may display, in the virtual room 204, the virtual object A1 and the virtual object B1 that corresponds to the object B. In addition, the virtual room 204 may further include a message display region 204a. Conversation messages generated in the instant conversation between the object A and the object B may be displayed in the message display region 204a. A conversation message (for example, "I went to the beach and saw a sunset") just transmitted by the object A is displayed in a conversation display box 204b. It may be understood that a background topic and a transparency of the conversation display box 204b are the same as those of the conversation display box 203e, and are also matched with the figure feature of the virtual object A1.

Figure 5:
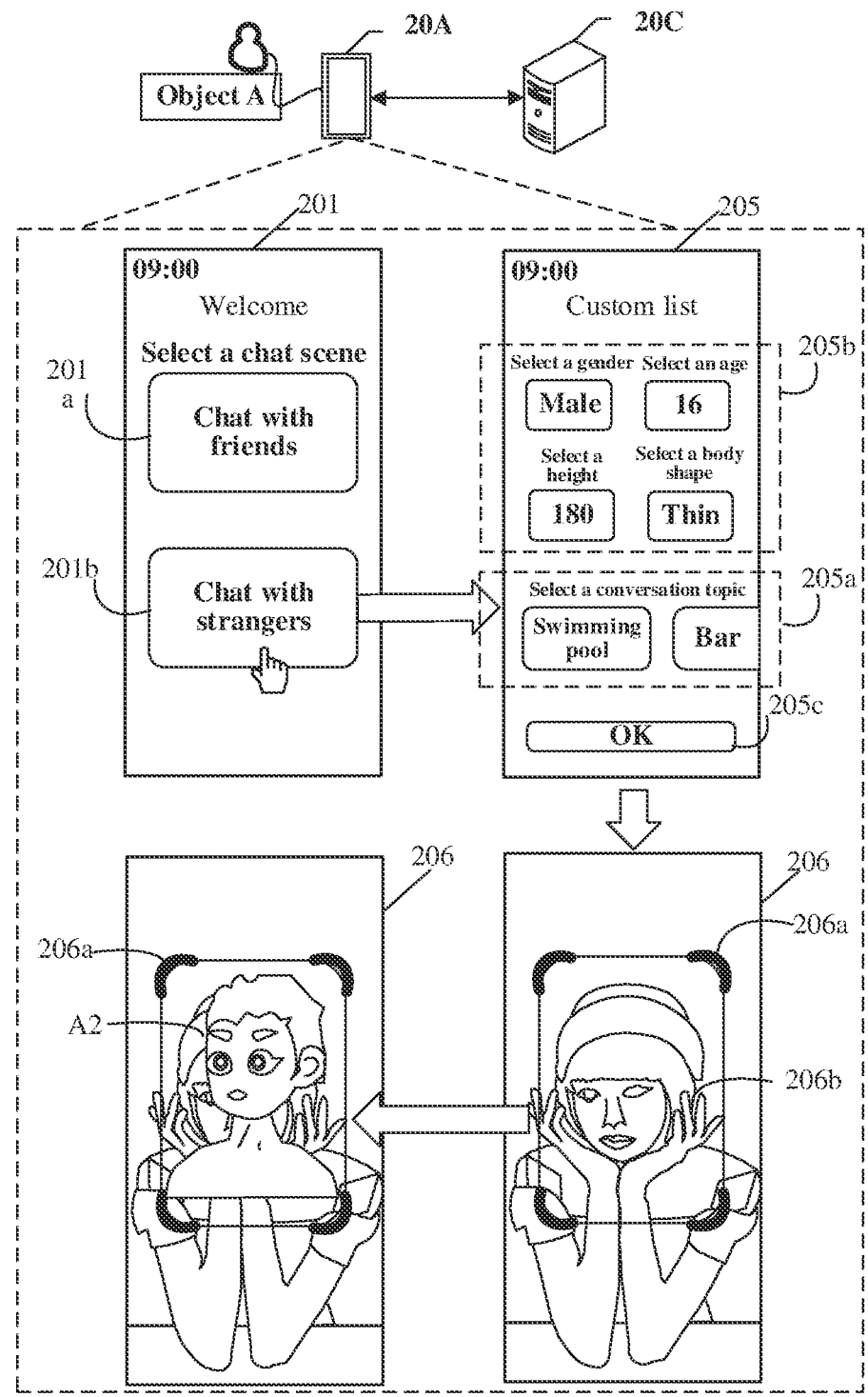
FIG. 5 is a schematic diagram of a virtual object generation scene under a chat-with-strangers function according to an embodiment of this disclosure.

If intending to use the chat-with-strangers function, the object A may perform a login operation on the chat-with-strangers function. For example, the object A may tap the chat-with-strangers control 201b. For ease of understanding, refer to FIG. 5 together. FIG. 5 is a schematic diagram of a virtual object generation scene under the chat-with-strangers function according to an embodiment of this disclosure. As shown in FIG. 5, the user terminal 20A displays a conversation element custom list 205 in response to a trigger operation on the chat-with-strangers control 201b on the conversation function selection interface 201. The conversation element custom list 205 includes a conversation topic configuration control 205a. A configuration operation on one or more conversation topics provided by the conversation element custom list 205 may be completed by using the conversation topic configuration control 205a. A target conversation topic determined through the configuration operation determines a space figure of a virtual conversation space to be entered by a virtual object corresponding to the object A. For example, if the target conversation topic is a swimming pool, the virtual conversation space is a virtual swimming pool. If the target conversation topic is a bar, the virtual conversation space is a virtual bar. The conversation element custom list 205 further includes an object figure element custom control bar 205b. The object figure element custom control bar 205b may include one or more element configuration controls, for example, a gender selection control, an age selection control, a height selection control, and a body shape selection control. Corresponding object figure elements may be configured by using these element configuration controls, so that the configured object figure elements are determined as target object figure elements. For example, a gender of the virtual object corresponding to the object A may be configured to be "Male" by using the gender selection control. For another example, an age of the virtual object corresponding to the object A may be configured to be "16" by using the age selection control. The user terminal 20A may determine, in response to a trigger operation on an element confirmation control 205c, the target conversation topic configured by using the conversation topic configuration control 205a and the target object figure elements determined by using the object figure element custom control bar 205b as custom conversation elements, and determine that the configuration operation on the conversation element custom list 205 is completed.

As shown in FIG. 5, when the configuration operation on the conversation element custom list 205 is completed, the user terminal 20A may display a login interface 206. The login interface 206 includes a shot picture display region 206a. After shooting the object A, the user terminal 20A displays a shot object image 206b of the object A in the shot picture display region. When the user terminal 20A determines that the object image 206b satisfies a login condition, the user terminal 20A may display the virtual object (that is, a first virtual object, for example, a virtual object A2) corresponding to the object A in the shot picture display region 206a. It is to be understood that a virtual object figure of the virtual object A2 may differ greatly from an object figure of the object A because the virtual object A2 is generated with reference more to a virtual object figure matched with the custom conversation elements. For example, as shown in FIG. 5, although the object A is a girl with medium-length hair, since the object A selects a 16-year-old boy when customizing conversation elements, the virtual object figure corresponding to the virtual object A2 is closer to an object figure of a 16-year-old boy with short hair. In addition, some uncustomized figure features of the virtual object A2 may be matched with the object A, for example, the facial form, the nose, and the mouse. Optionally, the user terminal 20A may configure, for the virtual object A2, virtual clothing associated with the target conversation topic. For example, when the target conversation topic is a swimming pool, the virtual clothing corresponding to the virtual object A2 may be a swimsuit.

Further, refer to FIG. 6. FIG. 6 is a schematic diagram of an instant conversation scene under the chat-with-strangers function according to an embodiment of this disclosure. As shown in FIG. 6, a virtual swimming pool 207 (that is, a virtual conversation space) may be entered by using the virtual object A2 in a swimsuit. In addition to displaying the virtual object A2 in the virtual swimming pool 207, the user terminal 20A may display a virtual object corresponding to another object entering the virtual swimming pool 207, for example, a virtual object C1 corresponding to the object C. For a process in which the object C enters the virtual swimming pool 207 by using the virtual object C1, refer to a process in which the object A in FIG. 5 enters the virtual swimming pool 207 by using the virtual object A2, and elaborations are omitted herein. It may be understood that virtual clothing of the virtual object corresponding to the another object entering the virtual swimming pool 207 is associated with the swimming pool topic.

Further, the user terminal 20A may generate, in response to a trigger operation on the virtual swimming pool 207, a conversation message (for example, "Do you like swimming") for transmission to the object C, and display the conversation message in a conversation display box 207b in a message display region 207a of the virtual swimming pool 207. A background topic of the conversation display box 207b is matched with a figure feature of the virtual object A2 corresponding to the object A. The virtual swimming pool 207 may further include a message entry control bar 207c. The message entry control bar 207c may include one or more message entry controls, for example, a text entry control, a status display control, and a voice control. Corresponding information may be input by using the message entry controls, thereby generating the conversation message required to be transmitted. In addition, the user terminal 20A may transmit the conversation message input by the object A to the server 20D. After receiving the conversation message, the server 20D forwards the conversation message to the user terminal 20C (that is, the second terminal). The user terminal 20C may also display the conversation message in a corresponding virtual conversation space. A difference from the instant conversation under the friend chatting function lies in that the virtual conversation space for the instant conversation in the user terminal 20C is also the virtual swimming pool 207, and a manner in which the user terminal 20C displays the conversation message of the object A may be the same as a manner in which the user terminal 20A displays the conversation message of the object A. Therefore, the user terminal 20C may also display the virtual swimming pool 207, then display, in the virtual swimming pool 207, the virtual object C1 and the virtual object A2 that participate in the instant conversation, and display, in the conversation display box 207b in the message display region 207a, the conversation message "Do you like swimming" just transmitted by the object A.

It is to be noted that data related to the object, for example, the object image, is involved. When the foregoing embodiments of this disclosure are applied to a specific product or technology, a license or consent of the object is required to be obtained, and collection, use, and processing of the related data are required to comply with related laws and regulations and standards of related countries and regions.

It can be seen from the above that in the embodiments of this disclosure, the object figure data of the object may be acquired in response to the login operation on the conversation function in the application client, and then the associated virtual object is generated based on the acquired object figure data and the login operation on the conversation function, so that virtuality of the virtual object is improved. In addition, both the space figure of the virtual conversation space and the background topic of the conversation display box are matched with the figure feature of the virtual object, and different instant conversation scenes are presented for different objects, so that instant conversation display modes are enriched.

Refer to FIG. 7. FIG. 7 is a schematic flowchart of a data processing method according to an embodiment of this disclosure. The data processing method may be performed by a computer device. The computer device may include the user terminal or server shown in FIG. 1. In this embodiment of this disclosure, a user terminal corresponding to a first object is referred to as a first terminal (for example, the user terminal 200a), and a user terminal corresponding to a second object is referred to as a second terminal (for example, the user terminal 200b). The first terminal or the second terminal may be a transmission terminal or a receiving terminal. For ease of understanding, an example in which the method is performed by the first terminal is used for description in this embodiment. The data processing method may include at least the following step S101 to step S103:

Step S101: Perform figure acquisition on the first object in response to a login operation on an application client, and display a first virtual object associated with an acquired object figure of the first object.

In some embodiments, figure acquisition is performed on the first object in response to a login operation on a conversation function in the application client, and a first virtual object associated with the acquired object figure of the first object and the conversation function is displayed.

Specifically, the conversation function may include a first conversation function (for example, the foregoing chat-with-friends function) for an instant conversation with an object in association with the first object (e.g., the object may be the friend of the first object), and a second conversation function (for example, the foregoing chat-with-strangers function) for an instant conversation with an object not in association with the first object. Different conversation functions correspond to different social scenes. An object often has different social requirements. For example, when the first object conducts an instant conversation with a second object in association, virtual object figures of corresponding virtual objects are required to be close to object figures of the objects, such that the first object and the second object seem to be talking face to face in the instant conversation. When the first object conducts an instant conversation with a second object not in association, the object often prefers a virtual object figure of a corresponding virtual object to be greatly different from an object figure of the object. In this embodiment of this disclosure, the object may correspond to different virtual objects under different conversation functions or different conversation scenarios. Therefore, when the first terminal starts the application client, a function selection interface (for example, the conversation function selection interface 201 shown in FIG. 2) of the application client is displayed first. The function selection interface may include a function control (for example, the chat-with-friends control 201a shown in FIG. 2) for the first conversation function and a function control (for example, the chat-with-strangers control 201b) for the second conversation function. When the object triggers a specific function control, the application client provides the corresponding conversation function. In some example implementations, when an object (e.g., a real person) starts a conversation session, a virtual appearance of the person may be similar to the real person, for example, when the conversation is chat-with-friend. On the other hand, if the conversation is with a stranger, the virtual appearance of the person may be quite different, or even on the opposite of the real person's image. Note that when the virtual appearance is similar to the real object, it does not require the appearances of the two to be the same, but critical appearance features, such as eye, nose, mouth, ear, may be similar.

Specifically, when a selected conversation function is the first conversation function, a process of performing figure acquisition on the first object in response to the login operation on the conversation function in the application client and displaying the first virtual object associated with the acquired object figure of the first object and the conversation function may be as follows: displaying a login interface including a shot picture display region in response to a login operation on the first conversation function in the application client; shooting the first object, and displaying a shot object image of the first object in the shot picture display region; and displaying, in the shot picture display region, a first virtual object matched with an object figure in the object image. For example, refer back to FIG. 3. The trigger operation on the chat-with-friends control 201a is the login operation on the first conversation function in the application client. The object image of the first object displayed in the shot picture display region 20b may be the object image 202c. Then, the first virtual object that is displayed in the shot picture display region 20b and that is matched with the object figure in the object image may be the virtual object A1. Displaying both the object image and the first virtual object of the first object in the shot picture display region facilitates comparison between the object image and the first virtual object of the first object, thereby reflecting an association between the first virtual object and the first object.

Specifically, a specific implementation process of displaying, in the shot picture display region, the first virtual object matched with the object figure in the object image may be as follows: displaying, in the shot picture display region in a case that the object image of the first object satisfies a login condition, the first virtual object matched with the object figure in the object image. In this way, a user may determine, according to whether the first virtual object is displayed in the shot picture display region, whether the object image of the first object satisfies the login condition, thereby performing a next operation. For example, if the first virtual object is displayed soon in the shot picture display region, the user knows that the object image of the first object satisfies the login condition, and there is no problem with the object image of the first object. If the first virtual object is not displayed in the shot picture display region for a long delay, the user knows that it is very likely that the object image of the first object cannot satisfy the login condition. In this case, the user promptly adjusts the object image of the first object (for example, shoot or upload another object image of the first object). Therefore, login time is saved for the user, and convenience for operation is improved. In this embodiment of this disclosure, the object may log in to the application client directly in a face scanning manner without registration. The object image obtained by the first terminal by performing object acquisition on the first object may also be used for login of the object, so as to save time and energy of the object in using the application client. Alternatively, in this embodiment of this disclosure, when the object logs in to the application client, registration and login may be implemented at the same time in a face scanning manner, and pre-registration is not required.

Optionally, after displaying, in the shot picture display region, the first virtual object matched with the object figure in the object image, the first terminal may switch displaying of the login interface to a main application interface, and display the first virtual object on the main application interface. An interface design element of the main application interface is matched with a figure feature of the first virtual object. In this embodiment of this disclosure, to bring better visual experience to the object, when the application client provides the first conversation function for the first object, in addition to generating the first virtual object similar to the first object according to the object figure of the first object every time, the interface design element of the main application interface may be updated based on the figure feature of the first virtual object. It can be seen from the above that the figure feature is any information for describing a related feature of a virtual object figure of the first virtual object, for example, figure body shape information, figure style information, figure clothing information, or figure color information. The interface design element may include an interface style and an interface color. Therefore, a process of updating the interface design element of the main application interface based on the figure feature of the first virtual object may be matching the interface color of the main application interface according to the figure color information of the first virtual object and matching the interface style of the main application interface according to the figure style information of the first virtual object.

Figure 8:
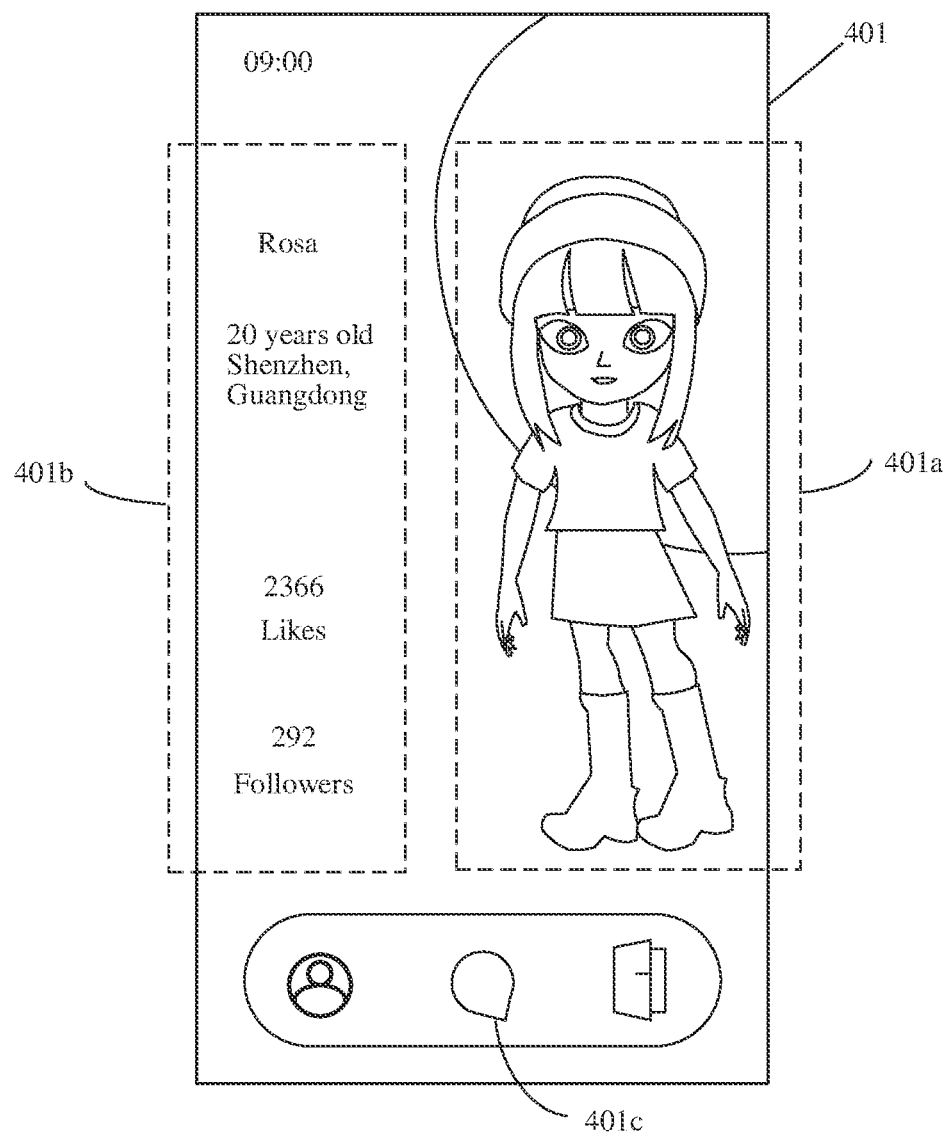
FIG. 8 is a schematic diagram of a main application interface according to an embodiment of this disclosure.

For ease of understanding, refer to FIG. 8 together. FIG. 8 is a schematic diagram of the main application interface according to an embodiment of this disclosure. As shown in FIG. 8, if the first terminal is the user terminal 20A in the embodiment corresponding to FIG. 3, a main application interface 401 may be displayed instead of the login interface 202 after the user terminal 20A displays the virtual object A1 for a while in the shot picture display region 202b on the login interface 202. The main application interface 401 includes a virtual object display region 401a and an object data display region 401b. A complete virtual object A1 is displayed in the virtual object display region 401a. Identity data information of the object A corresponding to the virtual object A1 may be displayed in the object data display region 401b, for example, a name, an age, a region, or a follower situation of the object A. It can be seen from FIG. 8 that an interface style of the main application interface 401 is matched with the figure style of the virtual object A1. For example, both the interface style and the figure style are simple and cute. An interface color of the main application interface 401 is also matched with the figure color of the virtual object A1, and both are light gray. It may be understood that when the object A logs in to the application client next time, if an overall figure color of a corresponding virtual object is of a black series, the interface color of the main application interface 401 is also displayed in the black series. In a word, the interface design element of the main application interface 401 is updated along with an object feature of the virtual object. The main application interface 401 further includes a conversation selection control 401c. The conversation selection control 401c may be triggered to switch the object to an associated object list.

Optionally, the main application interface further includes a conversation selection control (for example, the conversation selection control 401c in the embodiment corresponding to FIG. 8). The first terminal may display an associated object list in response to a trigger operation on the conversation selection control. The associated object list includes an associated object in association with the first object. It is to be understood that in an application client with an instant conversation function, after two objects establish a friend relationship by using the application client, the two objects know identity information of each other in the application client, and may conduct an instant conversation by using the application client. The associated object list of the first object may display information associated with an object establishing a friend relationship with the first object, such that the first object may select, by using the associated object list, an object that the first object intends to conduct an instant conversation with. Therefore, the first terminal may determine a selected associated object in association as the second object in response to a selection operation on the associated object list, and enter, by using the first virtual object, a virtual conversation space associated with the second object (that is, display, by using the first virtual object, the virtual conversation space associated with the second object). A space figure of the virtual conversation space is matched with a figure feature of a second virtual object. The second virtual object is associated with an object figure of the second object. One or more virtual objects further include the second virtual object. The associated object list includes an object display region corresponding to the associated object. The object display region may include basic object identity information of the associated object and a virtual object corresponding to the associated object. A display topic material of the object display region is matched with a figure feature of the virtual object corresponding to the associated object. Optionally, the virtual object corresponding to the associated object in the object display region is displayed in a target virtual posture. The target virtual posture is matched with a communication login status of the associated object. The associated object list is displayed to display the associated object in association with the first object, thereby facilitating displaying of a virtual conversation space corresponding to the associated object and conduction of a conversation with the associated object. This avoids inconvenience for operation brought by selection of a wrong conversation object by the user, that is, reduces a probability of mis-operation. The associated object list includes only the associated object, so that time required by the user to look for an object that the user intends to conduct a conversation with is reduced, and convenience for operation of the user is further improved. In addition, the virtual object corresponding to the associated object is displayed in the target virtual posture, so that the user may know, according to the target virtual posture corresponding to the associated object, whether the associated object is online (that is, whether the associated object is in a login state). This helps the user find an associated object in the login state for a conversation, and improves convenience for operation of the user and conversation efficiency of the conversation between the user and the associated object. In some example implementations, a space figure may be the space theme, or space setting. For example, when object in the space is a musician, the space figure may be a stadium, a theater, a club, etc. When the object in the space is a scientist, the space figure may be a lab, a classroom, etc.

Figure 9:
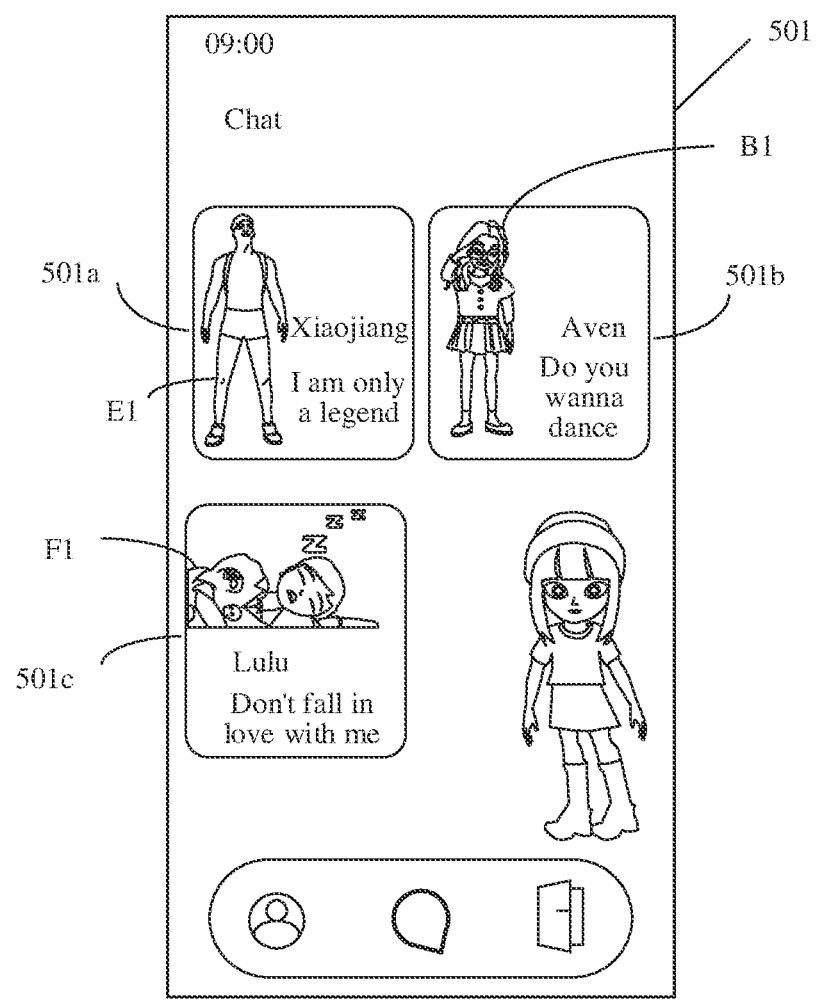
FIG. 9 is a schematic diagram of displaying an associated object list according to an embodiment of this disclosure.

For ease of understanding, refer to FIG. 9 together. FIG. 9 is a schematic diagram of displaying the associated object list according to an embodiment of this disclosure. It is assumed that the first terminal is the user terminal 20A in the embodiment corresponding to FIG. 3. As shown in FIG. 9, an associated object list 501 may be a picture displayed by the user terminal 20A in response to a trigger operation on the conversation selection control 401c in the main application interface 401 shown in FIG. 8. It is assumed that in addition to the object B bound with the user terminal 20B, an associated object in association with the object A bound with the user terminal 20A further includes an object E and an object F. In this case, the associated object list 501 displays information associated with the object B, the object E, and the object F. As shown in FIG. 9, the associated object list 501 may include a specific object display region corresponding to each object in association with the object A, for example, an object display region 501a corresponding to the object E, an object display region 501b corresponding to the object B, and an object display region 501c corresponding to the object F. Basic object identity information of the object E and a corresponding virtual object E1 are displayed in the object display region 501a. Basic object identity information of the object B and the corresponding virtual object B1 are displayed in the object display region 501b. Basic object identity information of the object F and a corresponding virtual object F1 are displayed in the object display region 501c. The basic object identity information may include a virtual name, a signature, an age, and other information of the object. This is not limited herein. As shown in FIG. 9, display topic materials of the object display region 501a, the object display region 501b, and the object display region 501c are different because the display topic material of each object display region is matched with a figure feature of the virtual object corresponding to the object displayed in the object display region. The display topic material may include a background color, a background pattern, a background material, and the like of the object display region. This is not limited herein. The background color is used as an example. As shown in FIG. 9, an overall figure color of a swimsuit of the virtual object E1 is white, so that a background color of the object display region 501a may be displayed in white. An overall figure color of the virtual object B1 is light gray plus white, so that a background color of the object display region 501b may be gradient from white to light gray. In addition, the target virtual posture of the virtual object corresponding to the associated object may be matched with the communication login status of the associated object. That is, different forms or postures of the virtual object may be used for representing different communication login states of the corresponding associated object. The communication login status is a login status of the associated object on the application client, may be set independently by the associated object, and includes but is not limited to an online state, an offline state, a busy state, a gaming state, a resting state, an invisible state, and the like. As shown in FIG. 9, the virtual object E1 is in a form of standing facing forward, and in this case, a communication login status of the object E corresponding to the virtual object E1 may be the online state. The virtual object F1 is in a sleeping form, and in this case, a communication login status of the object F corresponding to the virtual object F1 may be the offline state.

Specifically, when a selected conversation function is the second conversation function, a process of performing figure acquisition on the first object in response to the login operation on the conversation function in the application client and displaying the first virtual object associated with the acquired object figure of the first object and the conversation function may be as follows: displaying a conversation element custom list (for example, the conversation element custom list 205 shown in FIG. 5) in response to a login operation on the second conversation function in the application client; displaying a shot picture display region (for example, the shot picture display region 206a shown in FIG. 5) in a case that a configuration operation on the conversation element custom list is completed; shooting the first object, and displaying a shot object image (for example, the object image 206b corresponding to the object A shown in FIG. 5) of the first object in the shot picture display region; and displaying, in the shot picture display region, a first virtual object (for example, the virtual object A2 shown in FIG. 5) matched with an object figure in the object image and a custom conversation element configured through the configuration operation. A process of responding to the configuration operation on the conversation element custom list may be as follows: determining a configured conversation topic as a target conversation topic in response to a configuration operation on one or more conversation topics in the conversation element custom list; determining a configured object figure element as a target object figure element in response to a configuration operation on an object figure element in the conversation element custom list; and determining the target conversation topic and the target object figure element as the custom conversation element. For example, refer back to FIG. 5. A target object figure element may be determined in response to a trigger operation on each element configuration control in the object figure element custom control bar 205b in the conversation element custom list 205. A target conversation topic may be determined in response to a trigger operation on the conversation topic configuration control 205a in the conversation element custom list 205. Displaying the conversation element custom list helps the user customize a personalized custom conversation element, thereby improving personality of the conversation element.

Optionally, after the target conversation topic is determined, and before the first virtual object matched with the object figure in the object image and the custom conversation element configured through the configuration operation is displayed in the shot picture display region, virtual clothing associated with the target conversation topic may be first configured for the first virtual object. After the first virtual object that is matched with the object figure in the object image and the custom conversation element configured through the configuration operation and that is dressed in the virtual clothing associated with the target conversation topic is displayed in the shot picture display region, a virtual conversation space associated with the target conversation topic may be entered by using the first virtual object in the virtual clothing associated with the target conversation topic. Optionally, the first virtual object is displayed when it is determined that the object image satisfies the login condition. It may be understood that a space figure of the virtual conversation space is associated with the target conversation topic. Virtual clothing of one or more virtual objects in the virtual conversation space is associated with the target conversation topic. For example, refer to FIG. 6. When the target conversation topic is a swimming pool, the virtual conversation space is the virtual swimming pool 207. In addition to the virtual object A2 (that is, the first virtual object) being dressed in the swimsuit, the virtual object C1 in the virtual swimming pool 207 is dressed in a swimsuit.

Optionally, since the application client may provide the one or more conversation topics, after the first virtual object enters the virtual conversation space associated with the target conversation topic, the first terminal may determine a conversation topic selected for switching as a switching conversation topic in response to a switching operation on the one or more conversation topics, update and display virtual clothing of the first virtual object to be virtual clothing associated with the switching conversation topic, and then switch to enter, by using the first virtual object in the virtual clothing associated with the switching conversation topic, a virtual conversation space associated with the switching conversation topic. The virtual clothing of the virtual object and the virtual conversation space are correspondingly switched while the conversation topic is switched. Therefore, the object figure of the virtual object and the space figure of the virtual conversation space are kept consistent with the conversation topic, and flexibility of displaying the object figure of the virtual object and the space figure of the virtual conversation space is also improved.

Figure 10:
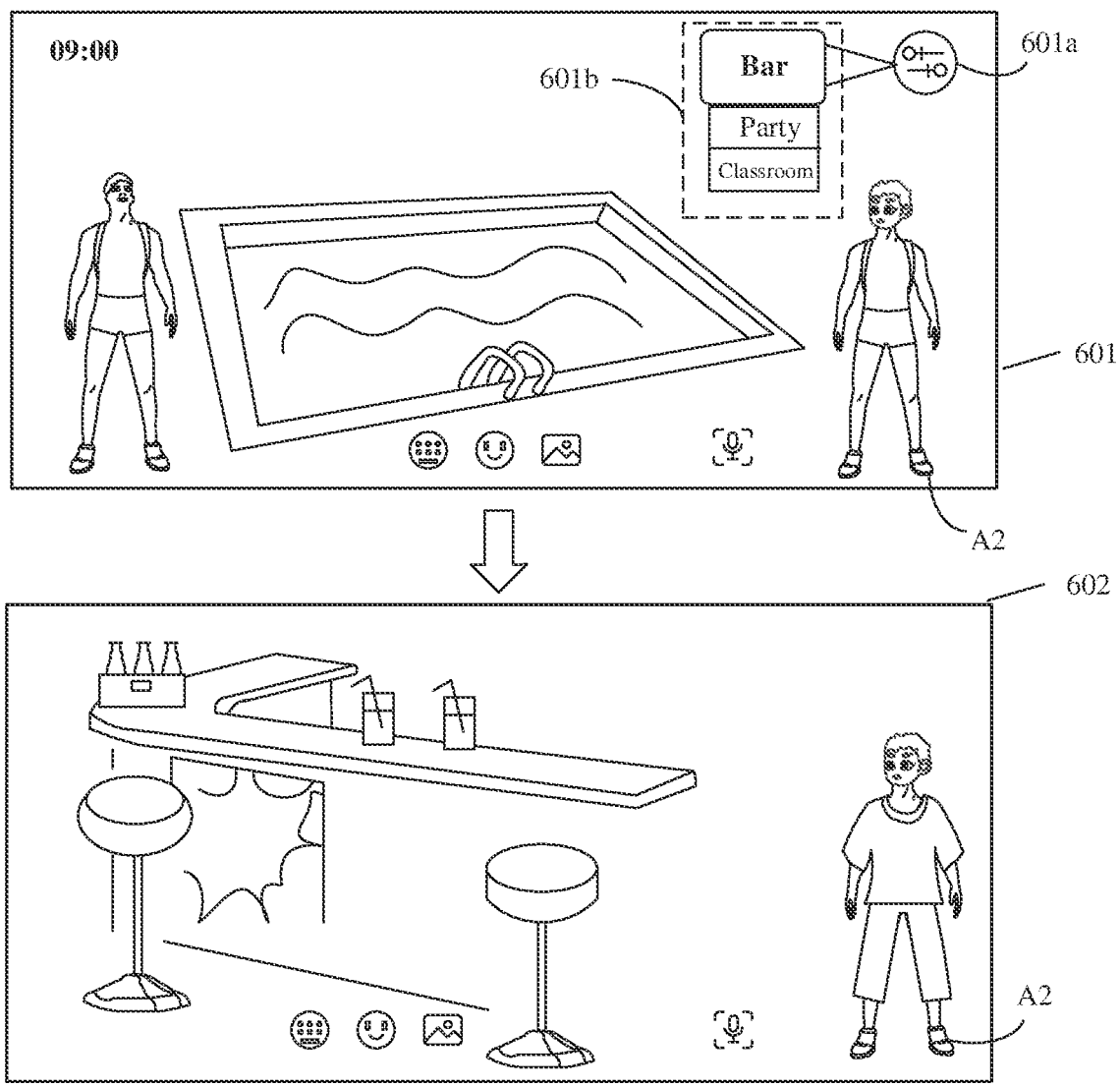
FIG. 10 is a schematic diagram of a scene in which a virtual conversation space associated with a switching conversation topic is entered according to an embodiment of this disclosure.

For ease of understanding, refer to FIG. 10 together. FIG. 10 is a schematic diagram of a scene in which the virtual conversation space associated with the switching conversation topic is entered according to an embodiment of this disclosure. It is assumed that the first terminal is the user terminal 20A in the embodiment corresponding to FIG. 6. As shown in FIG. 10, the user terminal 20A displays a virtual swimming pool 601 (that is, the virtual swimming pool 207 shown in FIG. 6), and the virtual object A2 corresponding to the object A with the binding relationship with the user terminal 20A is displayed in the virtual swimming pool 601. As shown in FIG. 10, the user terminal 20A may further display a conversation topic switching control 601a in the virtual swimming pool 601. The user terminal 20A may display one or more switchable conversation topics in a topic selection region 601b in response to a trigger operation on the conversation topic switching control 601c, for example, "Bar", "Party", and "Classroom". If the user terminal 20A determines, in response to a switching operation on the one or more conversation topics, that the switching conversation topic is "Bar", the user terminal 20A may switch displaying of the virtual swimming pool 601 to a virtual bar 602, and switch the swimsuit of the virtual object A2 corresponding to the object A to clothing associated with the bar, for example, a casual short-sleeved shirt and long trousers. Then, the user terminal 20A may display the virtual object A2 in the virtual bar 602. If another object has entered the virtual bar 602 by using a corresponding virtual object before the object A enters the virtual bar 602 by using the virtual object A2, the user terminal 20A may display the virtual object corresponding to the another object together in the virtual bar 602.

Step S102: Display, in a case that a virtual conversation space is entered by using the first virtual object, one or more virtual objects in the virtual conversation space, the one or more virtual objects including the first virtual object, and a space figure of the virtual conversation space is associated with the one or more virtual objects.

In some embodiments, the one or more virtual objects are displayed in the virtual conversation space when the virtual conversation space associated with the conversation function is entered by using the first virtual object. The one or more virtual objects include the first virtual object. The space figure of the virtual conversation space is associated with the one or more virtual objects.

Specifically, it can be seen from the above that when the conversation function is the first conversation function, the virtual conversation space that the first virtual object enters is usually the virtual conversation space associated with the second object. The second object is an object selected by the first object for an instant conversation. The second object is in association with the first object. In addition, the virtual conversation space associated with the second object is matched with the figure feature of the second virtual object. The second virtual object is associated with the object figure of the second object. In this case, the first virtual object and the second virtual object are displayed in the virtual conversation space. Optionally, the association may be a friend relationship, a family relationship, a working relationship, or the like. This is not specifically limited in this embodiment of this disclosure.

Specifically, it can be seen from the above that when the conversation function is the second conversation function, the virtual conversation space that the first virtual object enters is usually the virtual conversation space associated with the target conversation topic selected by the first object. The space figure of the virtual conversation space is associated with the target conversation topic. A virtual object corresponding to another object may also enter the virtual conversation space. The first terminal may display any virtual object entering the virtual conversation space in the virtual conversation space. In addition, the virtual clothing of the one or more virtual objects in the virtual conversation space is associated with the target conversation topic.

Step S103: Display a conversation message corresponding to each of the one or more virtual objects in the virtual conversation space.

Specifically, if the one or more virtual objects include a virtual object M, the first terminal may display a conversation message corresponding to the virtual object M in the virtual conversation space by using a conversation display box. A background topic (or background theme, background setting) of the conversation display box is matched with a figure feature of the virtual object M. Then, the first terminal may display the conversation display box in a transparency gradient manner, and cancel displaying of the conversation display box in a case that display duration of the displayed conversation display box reaches duration of a display life cycle. For example, refer back to FIG. 4. Background topics of the conversation display box 203d and the conversation display box 203b that correspond to the virtual object A1 are both matched with the figure feature of the virtual object A1. In addition, a transparency of the conversation display box 203d gradually increases with display time. Apparently, the transparency of the conversation display box 203d is higher than that of the conversation display box 203b. Displaying the conversation display box in the transparency gradient manner enables the user to know the display duration of the conversation display box according to the transparency of the conversation display box, thereby selecting a next operation to be performed. In this way, convenience for operation of the user is improved.

Figure 11:
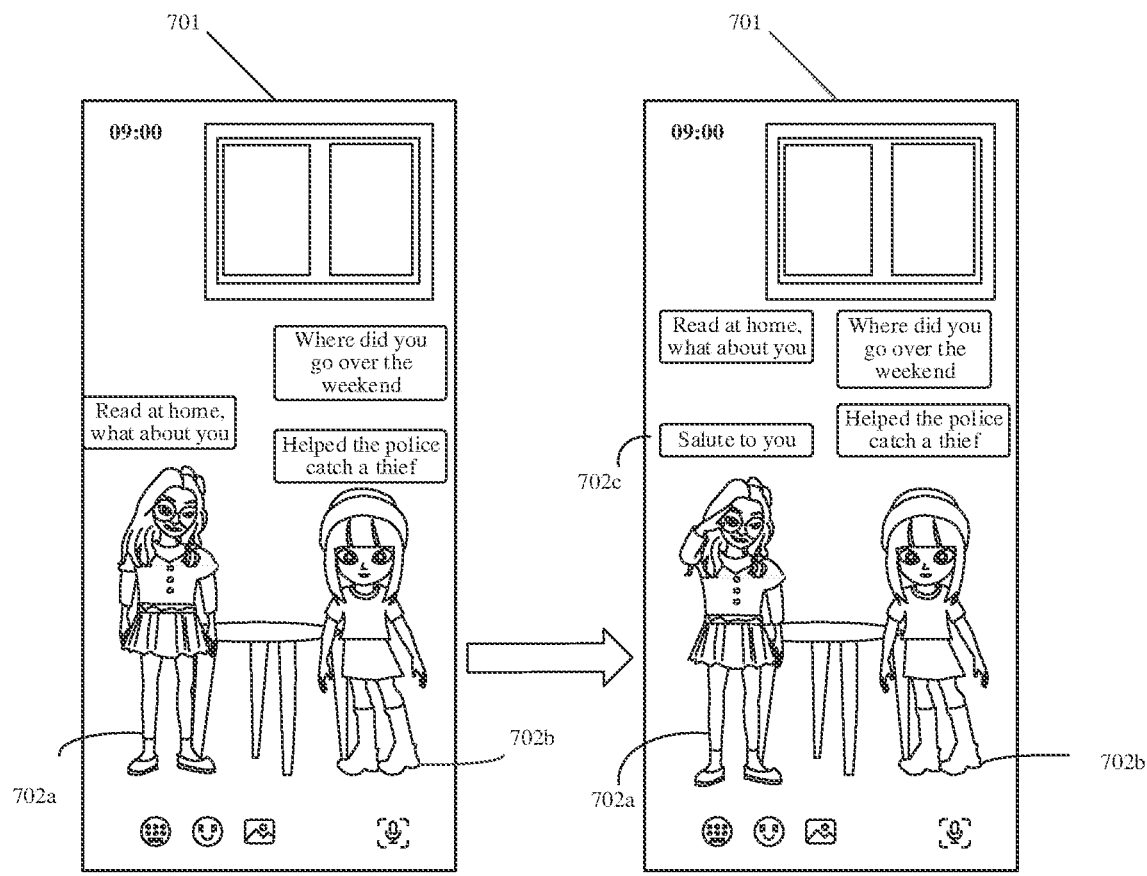
FIG. 11 is a schematic diagram of displaying an action of a virtual object according to an embodiment of this disclosure.

Optionally, in response to detecting that a conversation message corresponding to the first virtual object carries an action status mapping text, action animation displaying is performed on the first virtual object based on a virtual action mapped by the action status mapping text, thereby enriching animation display modes and display effects of the virtual object. Action animation displaying may be a process of updating and displaying a current action of the first virtual object to be a virtual action mapped by the action status mapping text. Alternatively, action animation displaying may be a process of displaying the first virtual object as performing a virtual action mapped by the action status mapping text. For ease of understanding, refer to FIG. 11. FIG. 11 is a schematic diagram of displaying an action of a virtual object according to an embodiment of this disclosure. As shown in FIG. 11, a virtual object 702a corresponding to an object Jia, a virtual object 702b corresponding to an object Yi, and a conversation message between the object Jia and the object Yi are displayed in a virtual conversation space 701. Both the virtual object 702a and the virtual object 702b perform an action of standing facing forward. In this case, the object Jia corresponding to the virtual object 702a transmits a conversation message 702c "Salute to you" by using a bound terminal. The first terminal detects that the conversation message 702c carries an action status mapping text "Salute". In this case, the first terminal may perform action animation displaying on the virtual object 702a. As shown in FIG. 11, the action of the virtual object 702a in the virtual conversation space 701 is changed to a saluting action. It may be understood that when the object Jia transmits a next conversation message or duration in which the virtual object 702a keeps the saluting action reaches a display duration threshold, the action of the virtual object 702a may be updated back to the action of standing facing forward.

In this embodiment of this disclosure, when a first object logs in to a social application, figure acquisition may be performed on the first object in response to a login operation on a conversation function in the social application, and a first virtual object associated with an acquired object figure of the first object and the conversation function is displayed. In a case that a virtual conversation space associated with the conversation function is entered by using the first virtual object, one or more virtual objects are displayed in the virtual conversation space, and a conversation message corresponding to each of the one or more virtual objects is displayed in the virtual conversation space. The one or more virtual objects include the first virtual object. A space figure of the virtual conversation space is associated with the one or more virtual objects. It can be seen that in each login to the social application, the first virtual object corresponding to the first object is associated with an object figure of the first object for login to the social application, so that virtuality of the first virtual object is improved. The object figure for each login may differ to some extent, so that the first virtual object generated each time is more diversified, and display modes of the first virtual object are enriched. The first virtual object may be generated by performing figure acquisition on the first object, so that efficiency of generating the first virtual object is improved. In addition, the space figure of the virtual conversation space is associated with the one or more virtual objects including the first virtual object, so that space figures of virtual conversation spaces corresponding to different virtual objects are more diversified, and display modes of an instant conversation are enriched.

Figure 12:
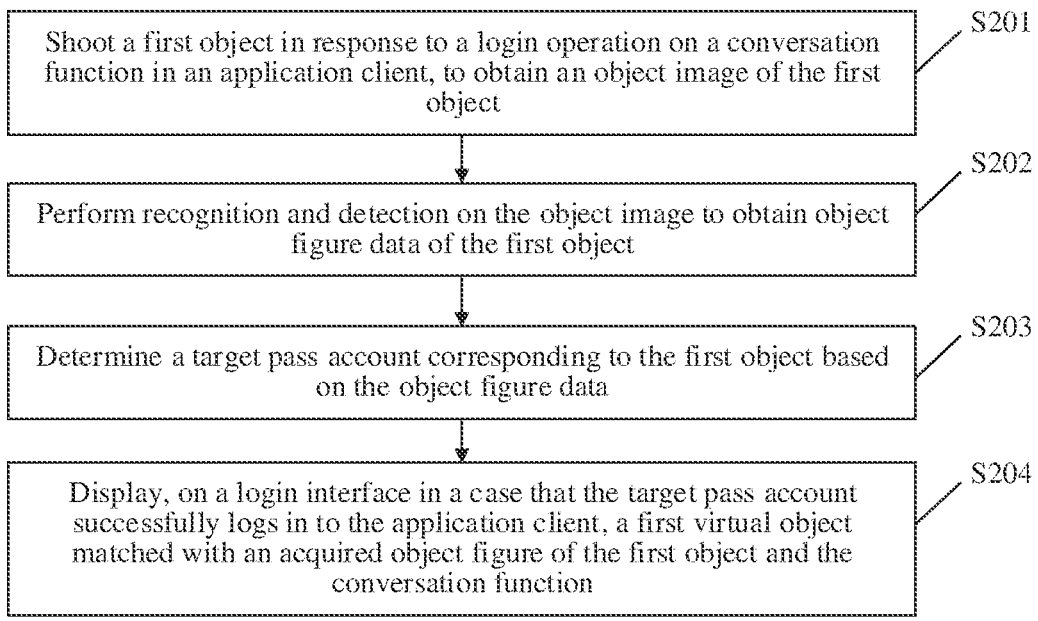
FIG. 12 is a schematic flowchart of a data processing method according to an embodiment of this disclosure.

Refer to FIG. 12. FIG. 12 is a schematic flowchart of a data processing method according to an embodiment of this disclosure. The data processing method is a feasible embodiment of step S101 in the embodiment corresponding to FIG. 7. Therefore, the data processing method may be performed by the computer device. The computer device may include the user terminal or server shown in FIG. 1. In this embodiment of this disclosure, the user terminal corresponding to the first object is referred to as the first terminal (for example, the user terminal 200a), and the user terminal corresponding to the second object is referred to as the second terminal (for example, the user terminal 200b). The first terminal or the second terminal may be a transmission terminal or a receiving terminal. For ease of understanding, an example in which the method is performed by the first terminal is used for description in this embodiment. The data processing method may include at least the following step S201 to step S204:

Step S201: Shoot the first object in response to the login operation on the conversation function in the application client, to obtain the object image of the first object.

Specifically, for an implementation process of step S201, refer to related descriptions about obtaining of the object image in step S101, and elaborations are omitted herein.

Step S202: Perform recognition and detection on the object image to obtain object figure data of the first object.

Specifically, recognition and detection on the object image may include key part recognition and body shape detection. Key part image data corresponding to the object image, that is, information about features of the five sense organs, a facial form, or the like of the object, may be obtained through key part recognition on the object image. Appearance feature data corresponding to the object image, including information about an appearance, a hair style, a body shape, clothing, and the like, may be obtained through body shape detection. Key part recognition may be face detection. Body shape detection may be human detection. It is to be noted that before the first terminal performs face detection or human detection, a license or consent of the user is required to be obtained, and collection, use, and processing of the related data are required to comply with related laws and regulations and standards of related countries and regions.

Figure 13:
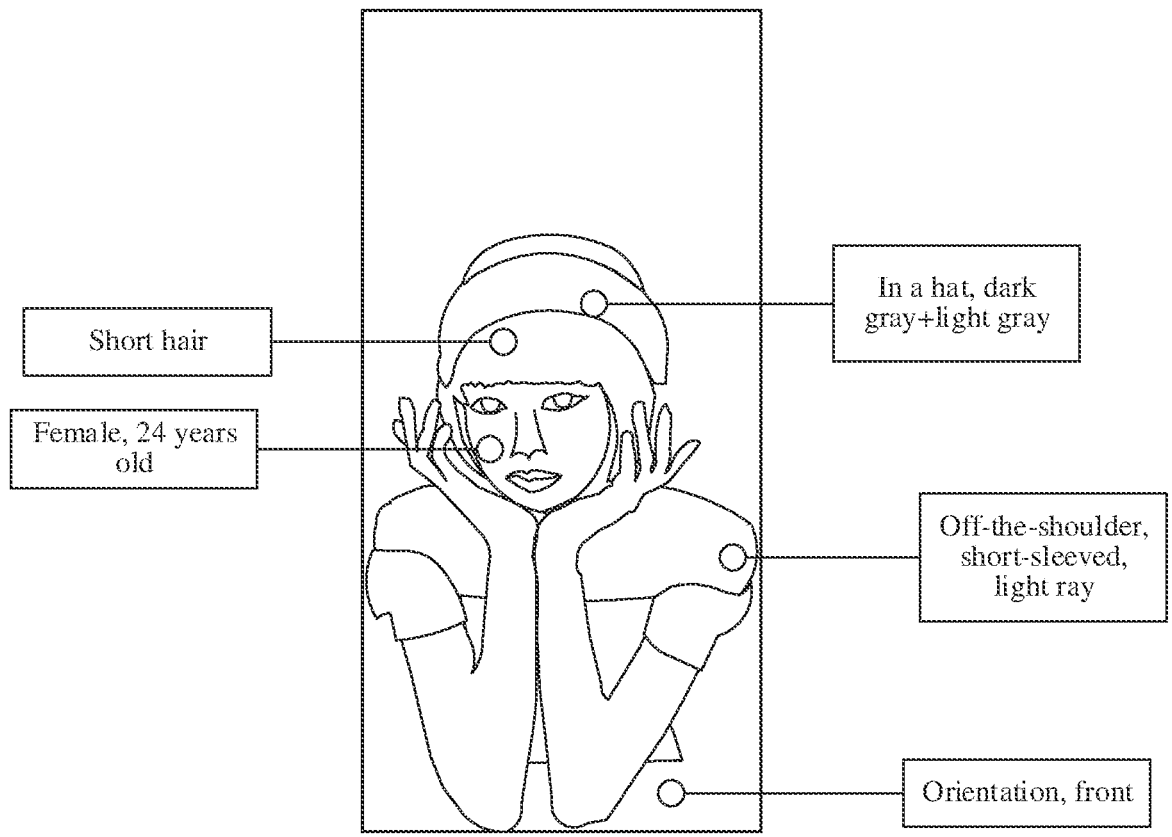
FIG. 13 is a schematic diagram of a body shape detection result according to an embodiment of this disclosure.

Specifically, a human detection process may be scanning the object image to obtain a current appearance feature of the object, including the appearance, the hair style, the body shape, the clothing, and the like. In addition, human detection can detect a human physical sign, including skeleton information, an age, wear, and the like of the user. The skeleton information may be used for helping determining the age and the body shape of the object. For ease of understanding, refer to FIG. 13 together. FIG. 13 is a schematic diagram of a body shape detection result according to an embodiment of this disclosure. As shown in FIG. 13, information obtained by performing human detection on the uploaded object image may include: wear/dress information: in a hat; hair style information: dark gray+light gray, short hair; gender information: female; age information: 24 years old; clothing information: Off-the-shoulder, short-sleeved, light ray; orientation information: front; and the like.

Step S203: Determine a target communication account corresponding to the first object based on the object figure data.

In some embodiments, an "account" in this embodiment of this disclosure has a same meaning as an "account number". For example, the "target communication account" may also be referred to as a "target communication account number".

Specifically, a manner for obtaining the target communication account may be as follows: in a case that the object figure data of the first object includes only the key part image data, obtaining the target communication account corresponding to the first object based on the object figure data. A process may specifically be as follows: traversing an object registration database according to the key part image data; and determining, in a case that registered image data similar to the key part image data is found from the object registration database, a communication account with a mapping relationship with the found registered image data similar to the key part image data as the target communication account corresponding to the first object; or generating the target communication account for the key part image data in a case that the object registration database does not include registered image data similar to the key part image data, and storing a mapping relationship between the key part image data and the target communication account to the object registration database. In some embodiments, the object registration database is configured to indicate a mapping relationship between key part image data and a communication account. It is to be noted that the process of obtaining the target communication account may be performed in the first terminal. Alternatively, the process may be performed by a server after the first terminal transmits the key part image data to the server, and then the first terminal is only required to receive the target communication account returned by the server. In some embodiments, the object registration database includes a plurality of pieces of registered image data. For example, the object registration database includes registered image data 1, registered image data 2, . . . , and registered image data n. In this case, key part image data x is obtained. The key part image data x may be sequentially matched with each piece of registered image data in the object registration database to obtain a matching degree between the key part image data x and each piece of registered image data. When a matching degree between the key part image data x and specific registered image data is higher than a matching threshold, it is considered that the key part image data x is similar to the registered image data. If the matching threshold is 97%, and a matching degree between the key part image data x and the registered image data 1 is 97.5%, a communication account corresponding to the registered image data 1 may be determined as the target communication account. It is to be understood that if a plurality of pieces of registered image data are similar to the key part image data, for example, in addition to the registered image data 1, a matching degree between the registered image data 2 and the key part image data x is 98%, exceeding the matching threshold, a communication account corresponding to registered image data corresponding to a highest matching degree is selected as the target communication account. If there is no registered image data whose matching degree with the key part image data exceeds the matching threshold, the key part image data is stored in the object registration database, and a unique communication account is generated for the key part image data. The communication account is different from a communication account corresponding to other registered image data. Traversing the object registration database according to the key part image data may determine whether there is the target communication account corresponding to the first object in the object registration database, thereby determining whether the user corresponding to the first object is a new user or a regular user, and storing key part image data corresponding to the new user.

Figure 14:
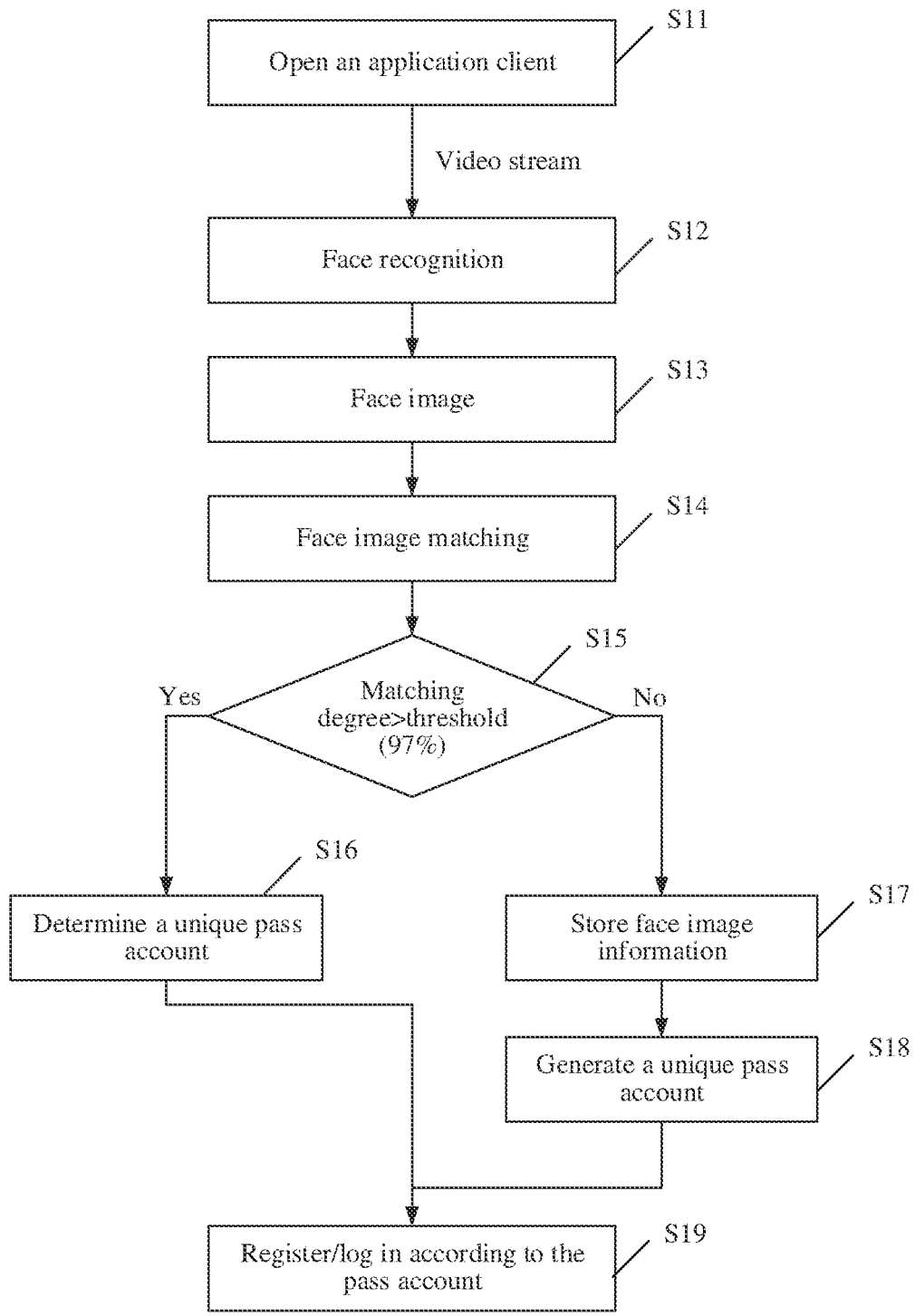
FIG. 14 is a schematic flowchart of determining a communication account according to an embodiment of this disclosure.

For ease of understanding, refer to FIG. 14 together. FIG. 14 is a schematic flowchart of determining a communication account according to an embodiment of this disclosure. A process of determining the communication account may be performed by the first terminal and the server, or may be independently performed by the first terminal. An example in which the process is independently performed by the first terminal is merely used herein for description. As shown in FIG. 14, a specific process of determining the communication account may include the following steps:

Step S11: The first terminal opens the application client in response to a startup operation on the application client.

Step S12: The first terminal performs object acquisition on the first object by using the application client to obtain a video stream (or the object image) corresponding to the first object, and performs face recognition on the acquired video stream.

Step S13: The first terminal obtains a face image corresponding to the first object.

Step S14: The first terminal performs face image matching in an image retrieval library based on the face image, and determines a matching degree between the face image and each face image in the image retrieval library.

Step S15: The first terminal determines whether an image whose matching degree with the face image is higher than a threshold (97%) is found from the image retrieval library. If the image whose matching degree is higher than the threshold is found, step S16 is performed. If the image whose matching degree is higher than the threshold is not found, step S17 is performed.

Step S16: The first terminal obtains a unique communication account corresponding to the image whose matching degree with the face image is higher than the threshold, determines the communication account as the communication account corresponding to the first object, and then performs step S19.

Step S17: The first terminal stores the face image in the image retrieval library.

Step S18: The first terminal generates a unique communication account for the face image, and then determines the generated unique communication account as the communication account corresponding to the first object.

Step S19: The first terminal completes registration and login or login of the first object in the application client by using the communication account. In case of the communication account obtained in step S16, the first terminal directly logs in to the application client by using the communication account. In case of the new communication account generated in step S18, the first terminal first implements registration in the application client by using the communication account, and then logs in.

Optionally, another manner for obtaining the target communication account may be as follows: in a case that the object figure data of the first object includes the key part image data and one or more pieces of appearance feature data, obtaining the target communication account corresponding to the first object based on the object figure data. A process may specifically be as follows: traversing an object registration database according to the key part image data; obtaining, in a case that registered image data similar to the key part image data is found from the object registration database, registered appearance feature data corresponding to the found registered image data similar to the key part image data; and determining, in a case that the one or more pieces of appearance feature data include the appearance feature data matched with the registered appearance feature data, a communication account with a mapping relationship with the found registered image data similar to the key part image data as the target communication account corresponding to the first object.

Figure 15:
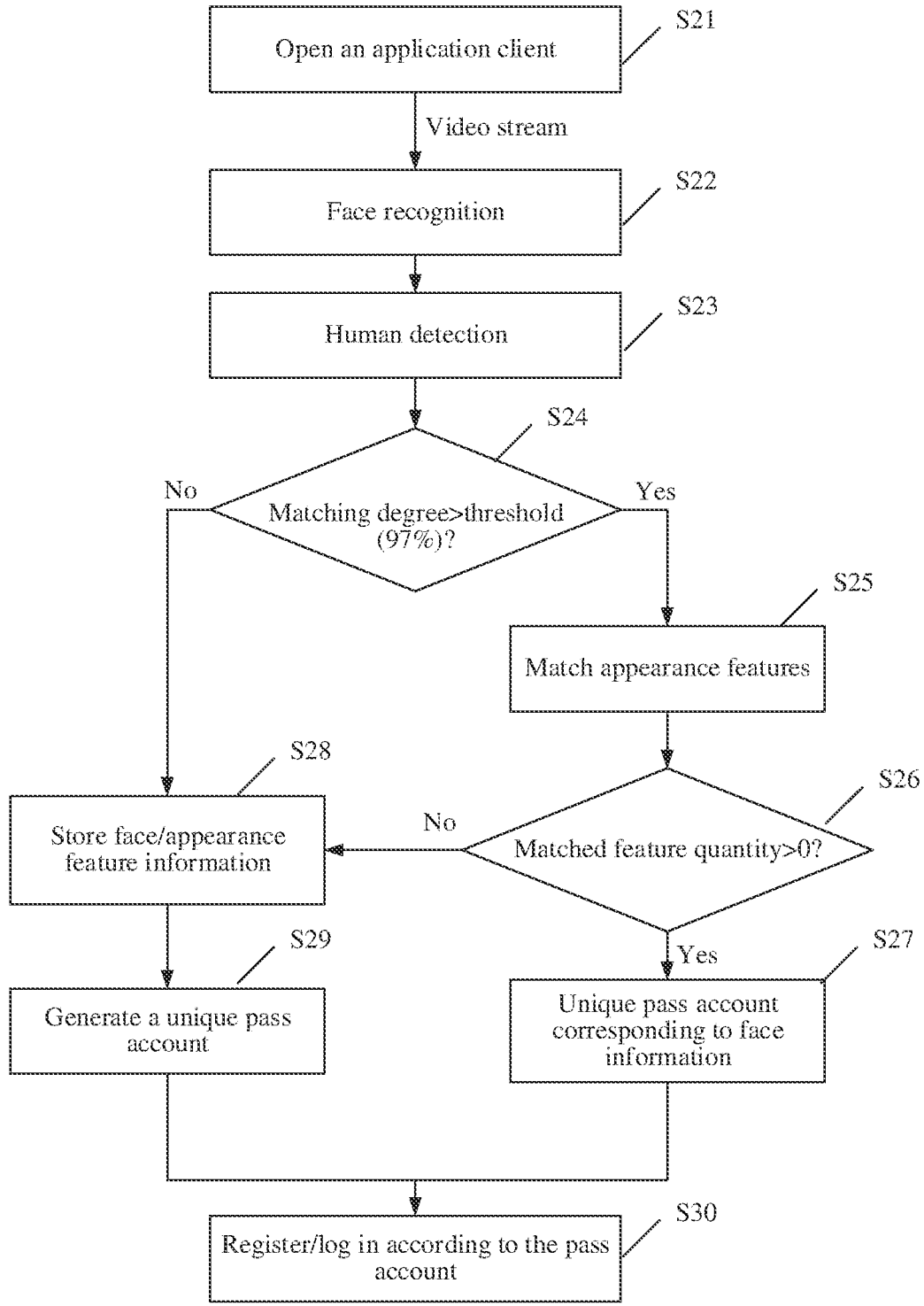
FIG. 15 is another schematic flowchart of determining a communication account according to an embodiment of this disclosure.

For ease of understanding, refer to FIG. 15 together. FIG. 15 is another schematic flowchart of determining a communication account according to an embodiment of this disclosure. A process of determining the communication account may be performed by the first terminal and the server, or may be independently performed by the first terminal. An example in which the process is independently performed by the first terminal is merely used herein for description. As shown in FIG. 15, a specific process of determining the communication account may include the following steps:

Step S21: The first terminal opens the application client in response to a startup operation on the application client.

Step S22: The first terminal performs object acquisition on the first object by using the application client to obtain a video stream (or the object image) corresponding to the first object, and performs face recognition on the acquired video stream to obtain a corresponding face image.

Step S23: The first terminal performs human detection on the video stream (or the object image) corresponding to the first object to obtain an appearance feature corresponding to the first object.

Step S24: The first terminal performs face image matching in an image retrieval library based on the face image, determines a matching degree between the face image and each face image in the image retrieval library, and determines whether an image whose matching degree with the face image is higher than a threshold (97%) is found from the image retrieval library. If the image whose matching degree is higher than the threshold is found, step S25 is performed. If the image whose matching degree is higher than the threshold is not found, step S28 is performed.

Step S25: The first terminal obtains an appearance feature corresponding to the image whose matching degree with the face image is higher than the threshold (97%), and matches the appearance feature corresponding to the first object with the appearance feature corresponding to the image one by one.

Step S26: The first terminal determines whether a matched feature quantity is greater than 0. If the matched feature quantity is greater than 0, step S27 is performed. If the matched feature quantity is not greater than 0, step S28 is performed.

Step S27: The first terminal determines a communication account corresponding to the image whose matching degree with the face image is higher than the threshold (97%) as the communication account corresponding to the first object, and performs step S30.

Step S28: The first terminal stores face image and the appearance feature that correspond to the first object.

Step S29: The first terminal generates a unique communication account for the face image, and determines the generated unique communication account as the communication account corresponding to the first object.

Step S30: The first terminal completes registration and login or login of the first object in the application client by using the communication account. In case of the communication account obtained in step S27, the first terminal directly logs in to the application client by using the communication account. In case of the new communication account generated in step S29, the first terminal first implements registration in the application client by using the communication account, and then logs in.

Step S204: Display, on the login interface in a case that the target pass account successfully logs in to the application client, the first virtual object matched with the acquired object figure of the first object and the conversation function.

Specifically, in the case that the target communication account successfully logs in to the application client, a virtual figure element matched with the object figure of the first object is obtained from a virtual element library. The virtual figure element is integrated to obtain the first virtual object associated with the acquired object figure of the first object and the conversation function, and the first virtual object is displayed on the login interface.

In some embodiments, figure feature information is extracted from the object figure data of the first object, and a target interface design element is matched according to the figure feature information. The login interface is switched to an initial main application interface. An interface design element of the initial main application interface is a default interface design element. The default interface design element is updated to the target interface design element on the initial main application interface to obtain the main application interface matched with the figure feature of the first virtual object. The first virtual object is displayed on the main application interface. Therefore, the main application interface is more personalized.

Figure 16:
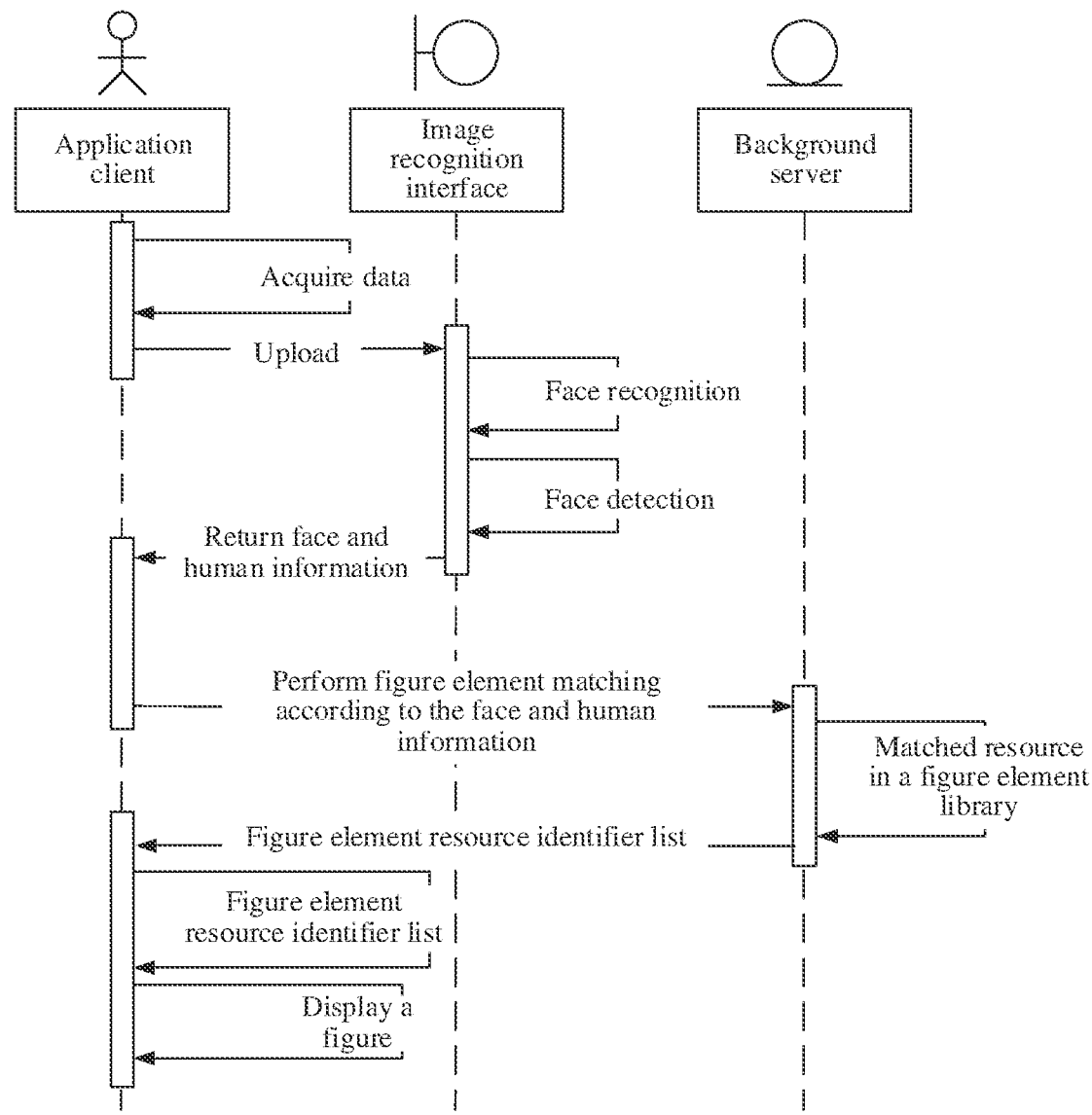
FIG. 16 is a schematic diagram of a virtual object generation and displaying process according to an embodiment of this disclosure.

For ease of understanding, refer to FIG. 16 together. FIG. 16 is a schematic diagram of a virtual object generation and displaying process according to an embodiment of this disclosure. As shown in FIG. 16, after acquiring the object image or object video corresponding to the object by using the application client, the first terminal may upload the acquired object image or object video to a face recognition model and a human detection model through an image recognition interface. Face recognition is performed on the object image or the object video by using the face recognition model to obtain face information. Human detection is performed on the object image or the object video by using the human detection model to obtain human information (or human feature information, human characteristic information). Then, the first terminal may organize the face information and the human information that are returned through the image recognition interface, and then upload the face information and the human information to a background server, such that the background server performs figure element resource matching in a figure element library according to the face information and the human information. The background server adds a resource identifier of a successfully matched figure element to a figure element resource identifier list, and delivers the figure element resource identifier list to the first terminal. With the figure element resource identifier list, the first terminal may download the corresponding figure element from the figure element library according to the resource identifier in the figure element resource identifier list. Then, the first terminal integrates the downloaded figure element, and displays the first virtual object obtained by integrating the figure element.

Optionally, the first terminal may perform feature extraction on the object image to obtain object feature data, and then input the object feature data to an object generator. Then, the object generator generates the corresponding first virtual object.

Optionally, when the conversation function is the second conversation function, generation of the first virtual object corresponding to the first object is required to comprehensively consider the object figure of the object and the custom conversation element of the first object configured through the configuration operation. In this case, a specific process in which the first terminal displays, in the shot picture display region, the first virtual object matched with the object figure in the object image and the custom conversation element configured through the configuration operation may be as follows: performing feature extraction on the object image to obtain original object feature data; obtaining a custom virtual figure corresponding to the custom conversation element configured through the configuration operation, and performing feature extraction on the custom virtual figure to obtain custom feature data; performing feature fusion on the original object feature data and the custom feature data to obtain fused feature data; and inputting the fused feature data to the object generator to obtain the first virtual object matched with the object figure in the object image and the custom conversation element configured through the configuration operation, and displaying the first virtual object.

Figure 17:
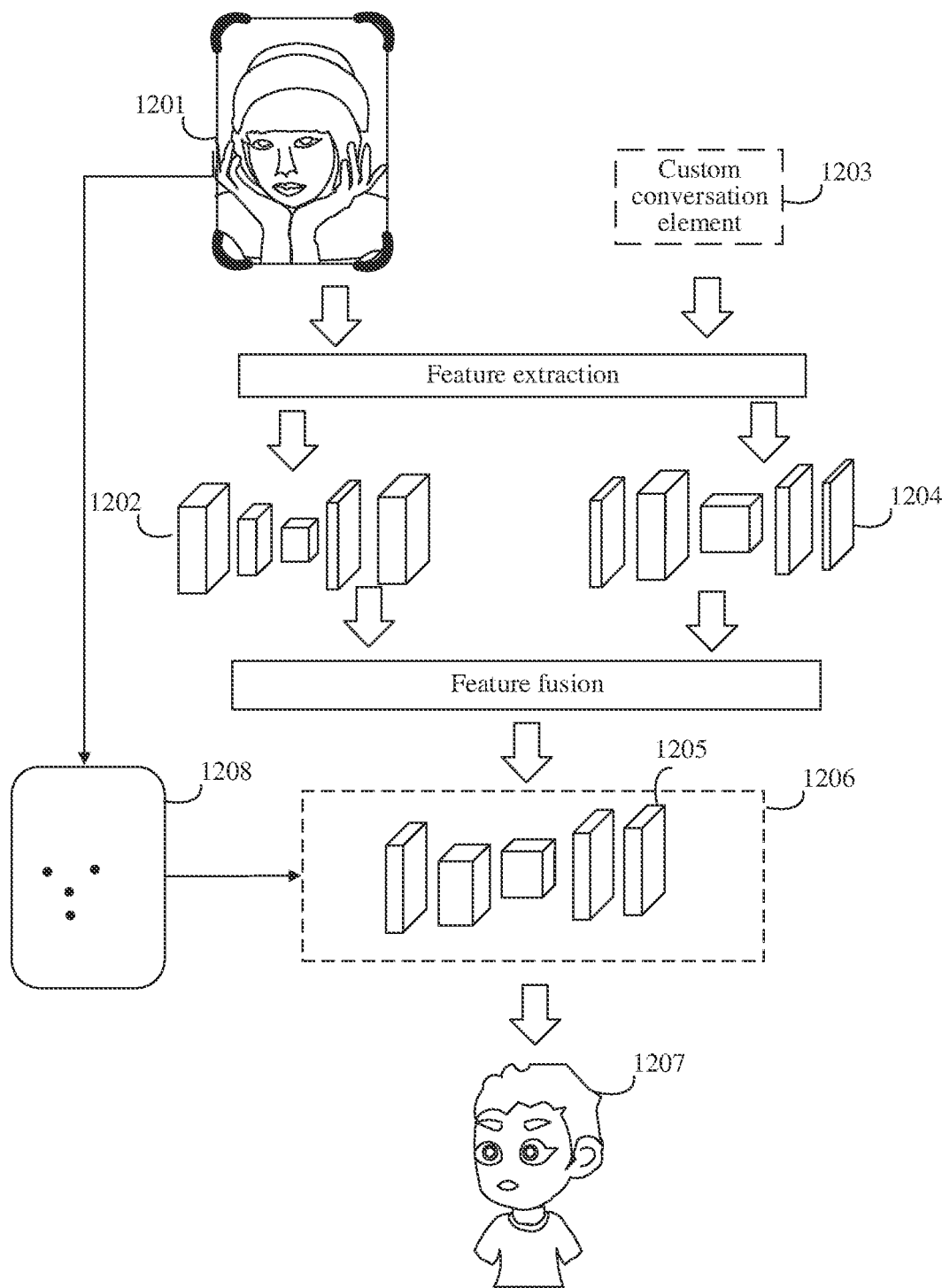
FIG. 17 is a schematic diagram of another virtual object generation and displaying process according to an embodiment of this disclosure.

For ease of understanding, refer to FIG. 17 together. FIG. 17 is a schematic diagram of a virtual object generation and displaying process according to an embodiment of this disclosure. As shown in FIG. 17, after obtaining an object image 1201 corresponding to the first object, the first terminal may perform feature extraction on the object image 1201 to obtain original object feature data 1202. After obtaining a custom conversation element 1203 configured through the configuration operation, the first terminal may perform feature extraction based on the custom conversation element 1203 to obtain custom feature data 1204. Then, the first terminal may perform feature fusion on the original object feature data 1202 and the custom feature data 1204 to obtain fused feature data 1205, and input the fused feature data 1205 to an object generator 1206, thereby generating a first virtual object 1207 matched with an object figure in the object image and the custom conversation element configured through the configuration operation. Optionally, to improve an association between the first virtual object 1207 and the first object, key part recognition may further be performed on the object image 1201 to obtain key point information 1208 corresponding to the object image. The key point information 1208 is used for describing position information of the five sense organs of the first object. The key point information 1208 is input to the object generator together, thereby better generating the position information of the five sense organs and the first virtual object matched with the position information of the five sense organs of the first object. The object generator may automatically generate the first virtual object matched with the object figure and the custom conversation element. Therefore, efficiency of generating the first virtual object is improved.

With adoption of the method provided in this embodiment of this disclosure, the object is not required to be additionally registered in the application client, and the first terminal may complete registration or login of the object by directly acquiring the object image of the object. The first virtual object corresponding to the first object may further be generated based on the object image. The object figure of the object may be mapped to the first virtual object in real time. In addition, human detection may be performed while face recognition is performed, to obtain the appearance feature of the first object. Design elements of the virtual conversation interface and the main application interface may be extracted from the appearance feature. Therefore, each object may enter a different virtual conversation space and main application interface which are matched with the virtual object of the object. This improves visual comfort.

Figure 18:
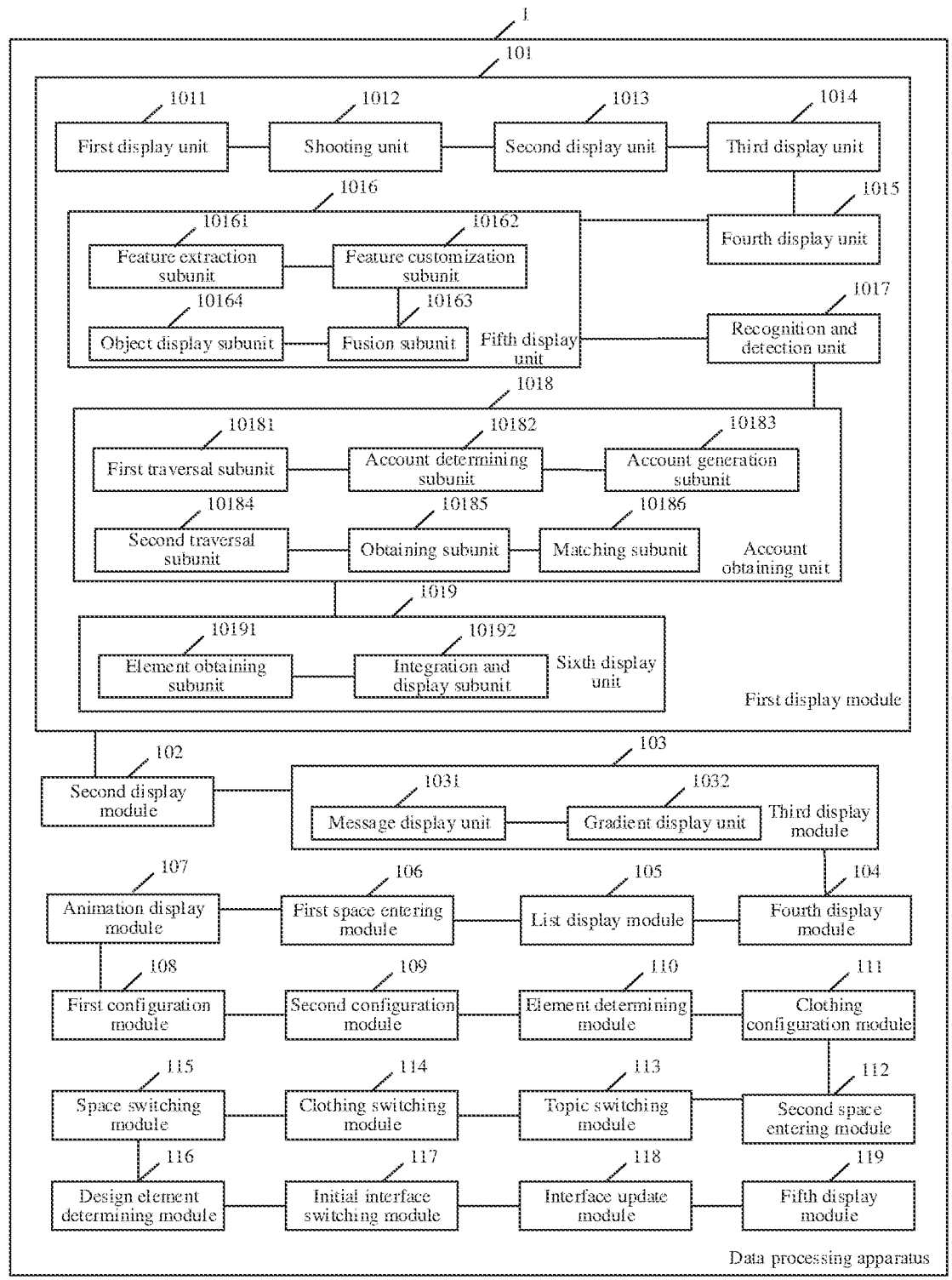
FIG. 18 is a schematic diagram of a structure of a data processing apparatus according to an embodiment of this disclosure.

Refer to FIG. 18. FIG. 18 is a schematic diagram of a structure of a data processing apparatus according to an embodiment of this disclosure. The data processing apparatus may be a computer program (including program code) run in a computer device. For example, the data processing apparatus is application software. The apparatus may be configured to perform the corresponding steps in the data processing method provided in the embodiments of this disclosure. As shown in FIG. 18, a data processing apparatus 1 may include a first display module 101, a second display module 102, and a third display module 103. In this disclosure, a unit and a module may be hardware such as a combination of electronic circuitries; firmware; or software such as computer instructions. The unit and the module may also be any combination of hardware, firmware, and software. In some implementation, a unit may include at least one module. Each unit or module can be implemented using one or more processors (or processors and memory). Likewise, a processor (or processors and memory) can be used to implement one or more units or modules. Moreover, each unit or module can be part of an overall unit or module that includes the functionalities of the unit or module.

The first display module 101 is configured to perform figure acquisition on a first object in response to a login operation on an application client, and display a first virtual object associated with an acquired object figure of the first object.

The second display module 102 is configured to display one or more virtual objects in a virtual conversation space in a case that the virtual conversation space is entered by using the first virtual object. The one or more virtual objects include the first virtual object. A space figure of the virtual conversation space is associated with the one or more virtual objects.

The third display module 103 is configured to display a conversation message corresponding to each of the one or more virtual objects in the virtual conversation space.

For specific implementations of the first display module 101, the second display module 102, and the third display module 103, refer to the descriptions about step S101 to step S103 in the embodiment corresponding to FIG. 7, and elaborations are omitted herein.

Refer back to FIG. 18. The first display module 101 may include a first display unit 1011, a first shooting unit 1012, and a second display unit 1013.

The first display unit 1011 is configured to display a login interface including a shot picture display region in response to a login operation on a first conversation function in the application client. The first conversation function is a conversation function for an instant conversation with an object in association with the first object.

The first shooting unit 1012 is configured to shoot the first object, and display a shot object image of the first object in the shot picture display region.

The second display unit 1013 is configured to display, in the shot picture display region, a first virtual object matched with an object figure in the object image.

For specific implementations of the first display unit 1011, the first shooting unit 1012, and the second display unit 1013, refer to the descriptions about step S101 in the embodiment corresponding to FIG. 7, and elaborations are omitted herein.

The second display unit is specifically configured to display, in the shot picture display region in a case that the object image of the first object satisfies a login condition, the first virtual object matched with the object figure in the object image.

Refer back to FIG. 18. The data processing apparatus 1 may further include a fourth display module 104.

The fourth display module 104 is configured to switch displaying of the login interface to a main application interface, and display the first virtual object on the main application interface. An interface design element of the main application interface is matched with a figure feature of the first virtual object.

For a specific implementation of the fourth display module 104, refer to the descriptions about step S101 in the embodiment corresponding to FIG. 7, and elaborations are omitted herein.

The main application interface includes a conversation selection control.

Refer back to FIG. 18. The data processing apparatus 1 may further include a list display module 105 and a first space entering module 106.

The list display module 105 is configured to display an associated object list in response to a trigger operation on the conversation selection control. The associated object list includes an associated object in association with the first object.

The first space entering module 106 is configured to determine a selected associated object in association as a second object in response to a selection operation on the associated object list, and enter, by using the first virtual object, a virtual conversation space associated with the second object. A space figure of the virtual conversation space is matched with a figure feature of a second virtual object. The second virtual object is associated with an object figure of the second object. The one or more virtual objects further include the second virtual object. The associated object list includes an object display region corresponding to the associated object. The object display region includes basic object identity information of the associated object and a virtual object corresponding to the associated object. A display topic material of the object display region is matched with a figure feature of the virtual object corresponding to the associated object. The virtual object corresponding to the associated object in the object display region is displayed in a target virtual posture. The target virtual posture is matched with a communication login status of the associated object.

For specific implementations of the list display module 105 and the first space entering module 106, refer to the descriptions about step S101 in the embodiment corresponding to FIG. 7, and elaborations are omitted herein.

The one or more virtual objects include a virtual object M.

Refer back to FIG. 18. The third display module 103 may include a message display unit 1031 and a gradient display unit 1032.

The message display unit 1031 is configured to display a conversation message corresponding to the virtual object M in the virtual conversation space by using a conversation display box. A background topic of the conversation display box is matched with a figure feature of the virtual object M.

The gradient display unit 1032 is configured to display the conversation display box in a transparency gradient manner, and cancel displaying of the conversation display box in a case that display duration of the displayed conversation display box reaches duration of a display life cycle.

For specific implementations of the message display unit 1031 and the gradient display unit 1032, refer to the descriptions about step S103 in the embodiment corresponding to FIG. 7, and elaborations are omitted herein.

Refer back to FIG. 18. The data processing apparatus 1 may further include an animation display module 107.

The animation display module 107 is configured to display, in response to detecting that a conversation message corresponding to the first virtual object carries an action status mapping text, an animation corresponding to the first virtual object based on a virtual action mapped by the action status mapping text.

For a specific implementation of the animation display module 107, refer to the descriptions about step S103 in the embodiment corresponding to FIG. 7, and elaborations are omitted herein.

The conversation function includes a second conversation function. The second conversation function is a conversation function for an instant conversation with an object not in association with the first object.

Refer back to FIG. 18. The first display module 101 may include a third display unit 1014, a fourth display unit 1015, and a fifth display unit 1016.

The third display unit 1014 is configured to: display a conversation element custom list in response to a login operation on a second conversation function in the application client, the second conversation function being a conversation function for an instant conversation with an object not in association with the first object; and display a shot picture display region in a case that a configuration operation on the conversation element custom list is completed.

The fourth display unit 1015 is configured to shoot the first object, and display a shot object image of the first object in the shot picture display region.

The fifth display unit 1016 is configured to display, in the shot picture display region, a first virtual object matched with an object figure in the object image and a custom conversation element configured through the configuration operation.

For specific implementations of the third display unit 1014, the fourth display unit 1015, and the fifth display unit 1016, refer to the descriptions about step S101 in the embodiment corresponding to FIG. 7, and elaborations are omitted herein.

Refer back to FIG. 18. The data processing apparatus 1 may further include a first configuration module 108, a second configuration module 109, and an element determining module 110.

The first configuration module 108 is configured to determine a configured conversation topic as a target conversation topic in response to a configuration operation on one or more conversation topics in the conversation element custom list.

The second configuration module 109 is configured to determine a configured object figure element as a target object figure element in response to a configuration operation on an object figure element in the conversation element custom list.

The element determining module 110 is configured to determine the target conversation topic and the target object figure element as the custom conversation element.

For specific implementations of the first configuration module 108, the second configuration module 109, and the element determining module 110, refer to the descriptions about step S101 in the embodiment corresponding to FIG. 7, and elaborations are omitted herein.

Refer back to FIG. 18. The data processing apparatus 1 may further include a clothing configuration module 111 and a second space entering module 112.

The clothing configuration module 111 is configured to configure, for the first virtual object, virtual clothing associated with the target conversation topic.

The second space entering module 112 is configured to enter, by using the first virtual object in the virtual clothing associated with the target conversation topic, a virtual conversation space associated with the target conversation topic, A space figure of the virtual conversation space is associated with the target conversation topic. Virtual clothing of one or more virtual objects in the virtual conversation space is associated with the target conversation topic.

For specific implementations of the clothing configuration module 111 and the second space entering module 112, refer to the descriptions about step S101 in the embodiment corresponding to FIG. 7, and elaborations are omitted herein.

Refer back to FIG. 18. The data processing apparatus 1 may further include a topic switching module 113, a clothing switching module 114, and a space switching module 115.

The topic switching module 113 is configured to determine, in response to a switching operation on the one or more conversation topics, a conversation topic selected for switching as a switching conversation topic.

The clothing switching module 114 is configured to update and display virtual clothing of the first virtual object to be virtual clothing associated with the switching conversation topic.

The space switching module 115 is configured to switch to display, by using the first virtual object in the virtual clothing associated with the switching conversation topic, a virtual conversation space associated with the switching conversation topic.

For specific implementations of the topic switching module 113, the clothing switching module 114, and the space switching module 115, refer to the descriptions about step S101 in the embodiment corresponding to FIG. 7, and elaborations are omitted herein.

Refer back to FIG. 18. The first display module 101 may include a recognition and detection unit 1017, an account obtaining unit 1018, and a sixth display unit 1019.

The recognition and detection unit 1017 is configured to shoot the first object in response to a login operation on a conversation function in the application client, to obtain an object image of the first object, and perform recognition and detection on the object image to obtain object figure data of the first object.

The account obtaining unit 1018 is configured to determine a target communication account corresponding to the first object based on the object figure data.

The sixth display unit 1019 is configured to display, on a login interface in a case that the target communication account successfully logs in to the application client, a first virtual object matched with an acquired object figure of the first object and the conversation function.

For specific implementations of the recognition and detection unit 1017, the account obtaining unit 1018, and the sixth display unit 1019, refer to the descriptions about step S201 to step S204 in the embodiment corresponding to FIG. 12, and elaborations are omitted herein.

Refer back to FIG. 18. The sixth display unit 1019 may include an element obtaining subunit 10191 and an integration and display subunit 10192.

The element obtaining subunit 10191 is configured to obtain, in a case that the target communication account successfully logs in to the application client, a virtual figure element matched with the object figure of the first object from a virtual element library.

The integration and display subunit 10192 is configured to integrate the virtual figure element to obtain the first virtual object associated with the acquired object figure of the first object and the conversation function, and display the first virtual object on the login interface.

For specific implementations of the element obtaining subunit 10191 and the integration and display subunit 10192, refer to the descriptions about step S204 in the embodiment corresponding to FIG. 12, and elaborations are omitted herein.

The object figure data of the first object includes key part image data.

Refer back to FIG. 18. The account obtaining unit 1018 may include a first traversal subunit 10181, an account determining subunit 10182, and an account generation subunit 10183.

The first traversal subunit 10181 is configured to traverse an object registration database according to the key part image data. The object registration database includes a plurality of pieces of registered image data.

The account determining subunit 10182 is configured to determine, in a case that registered image data similar to the key part image data is found from the object registration database, a communication account with a mapping relationship with the found registered image data similar to the key part image data as the target communication account corresponding to the first object.

The account generation subunit 10183 is configured to generate the target communication account for the key part image data in a case that the object registration database does not include registered image data similar to the key part image data, and store a mapping relationship between the key part image data and the target communication account to the object registration database.

For specific implementations of the first traversal subunit 10181, the account determining subunit 10182, and the account generation subunit 10183, refer to the descriptions about step S203 in the embodiment corresponding to FIG. 12, and elaborations are omitted herein.

The object figure data of the first object includes key part image data and one or more pieces of appearance feature data.

Refer back to FIG. 18. The account obtaining unit 1018 may include a second traversal subunit 10184, an obtaining subunit 10185, and a matching subunit 10186.

The second traversal subunit 10184 is configured to traverse an object registration database according to the key part image data. The object registration database includes a plurality of pieces of registered image data.

The obtaining subunit 10185 is configured to obtain, in a case that registered image data similar to the key part image data is found from the object registration database, registered appearance feature data corresponding to the found registered image data similar to the key part image data.

The matching subunit 10186 is configured to determine, in a case that the one or more pieces of appearance feature data include the appearance feature data matched with the registered appearance feature data, a communication account with a mapping relationship with the found registered image data similar to the key part image data as the target communication account corresponding to the first object.

For specific implementations of the second traversal subunit 10184, the obtaining subunit 10185, and the matching subunit 10186, refer to the descriptions about step S203 in the embodiment corresponding to FIG. 12, and elaborations are omitted herein.

Refer back to FIG. 18. The data processing apparatus 1 may further include a design element determining module 116, an initial interface switching module 117, an interface update module 118, and a fifth display module 119.

The design element determining module 116 is configured to extract figure feature information from the object figure data of the first object, and match a target interface design element according to the figure feature information.

The initial interface switching module 117 is configured to switch the login interface to an initial main application interface. An interface design element of the initial main application interface is a default interface design element.

The interface update module 118 is configured to update the default interface design element to the target interface design element on the initial main application interface to obtain a main application interface matched with a figure feature of the first virtual object.

The fifth display module 119 is configured to display the first virtual object on the main application interface.

For specific implementations of the design element determining module 116, the initial interface switching module 117, the interface update module 118, and the fifth display module 119, refer to the descriptions about step S204 in the embodiment corresponding to FIG. 12, and elaborations are omitted herein.

Refer back to FIG. 18. The sixth display unit 1019 may further include a feature extraction subunit 10191, a feature customization subunit 10192, a fusion subunit 10193, and an object display subunit 10194.

The feature extraction subunit 10191 is configured to perform feature extraction on the object image to obtain original object feature data.

The feature customization subunit 10192 is configured to obtain a custom virtual figure corresponding to the custom conversation element configured through the configuration operation, and perform feature extraction on the custom virtual figure to obtain custom feature data.

The fusion subunit 10193 is configured to perform feature fusion on the original object feature data and the custom feature data to obtain fused feature data.

The object display subunit 10194 is configured to input the fused feature data to the object generator to obtain the first virtual object matched with the object figure in the object image and the custom conversation element configured through the configuration operation, and display the first virtual object.

For specific implementations of the feature extraction subunit 10191, the feature customization subunit 10192, the fusion subunit 10193, and the object display subunit 10194, refer to the descriptions about step S101 in the embodiment corresponding to FIG. 7, and elaborations are omitted herein.

Figure 19:
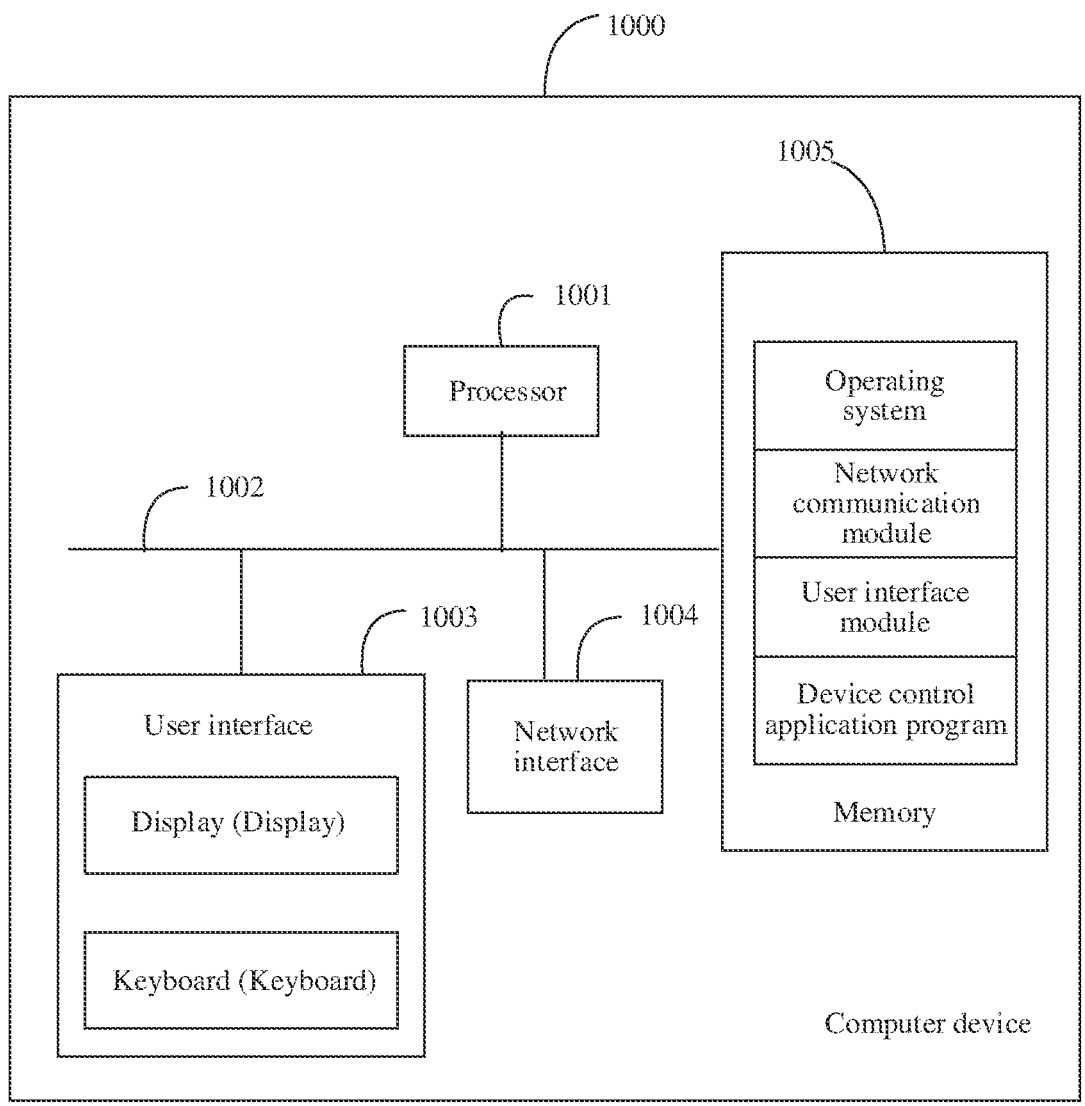
FIG. 19 is a schematic diagram of a structure of a computer device according to an embodiment of this disclosure.

Refer to FIG. 19. FIG. 19 is a schematic diagram of a structure of a computer device according to an embodiment of this disclosure. As shown in FIG. 19, a computer device 1000 may include a processor 1001, a network interface 1004, and a memory 1005. In addition, the computer device 1000 may further include a user interface 1003 and at least one communication bus 1002. The communication bus 1002 is configured to implement connection and communication between these components. The user interface 1003 may include a display and a keyboard. Optionally, the user interface 1003 may further include a standard wired interface and wireless interface. Optionally, the network interface 1004 may include a standard wired interface and wireless interface (for example, a wireless fidelity (Wi-Fi) interface). The memory 1004 may be a high-speed random access memory (RAM), or a non-volatile memory, for example, at least one disk memory. Optionally, the memory 1005 may be at least one storage apparatus far away from the processor 1001. As shown in FIG. 19, as a computer-readable storage medium, the memory 1005 may include an operating system, a network communication module, a user interface module, and a device control application program.

In the computer device 1000 shown in FIG. 19, the network interface 1004 may provide a network communication network element. The user interface 1003 is mainly configured to provide an input interface for a user. The processor 1001 may be configured to invoke the device control application program stored in the memory 1005 to implement:

performing figure acquisition on a first object in response to a login operation on a conversation function in an application client, and displaying a first virtual object associated with an acquired object figure of the first object and the conversation function;

displaying, in a case that a virtual conversation space associated with the conversation function is entered by using the first virtual object, one or more virtual objects in the virtual conversation space, the one or more virtual objects including the first virtual object, and a space figure of the virtual conversation space being associated with the one or more virtual objects; and displaying a conversation message corresponding to each of the one or more virtual objects in the virtual conversation space.

It is to be understood that the computer device 1000 described in this embodiment of this disclosure may execute the descriptions about the data processing method in the embodiment corresponding to any one of FIG. 7 and FIG. 12. Elaborations are omitted herein. In addition, beneficial effects of the same method are not described herein again.

In addition, an embodiment of this disclosure also provides a non-transitory computer-readable storage medium. The non-transitory computer-readable storage medium stores a computer program executed by the data processing apparatus 1 mentioned above. The computer program includes program instructions. A processor, when executing the program instructions, may execute the descriptions about the data processing method in the embodiment corresponding to any one of FIG. 7 and FIG. 12. Therefore, elaborations are omitted herein. In addition, beneficial effects of the same method are not described herein again. For technical details that are not disclosed in the embodiment of the non-transitory computer-readable storage medium involved in this application, refer to the descriptions in the method embodiment of this disclosure.

The non-transitory computer-readable storage medium may be an internal storage unit of the data processing apparatus or the computer device provided in any one of the foregoing embodiments, for example, a hard disk or internal memory of the computer device. The non-transitory computer-readable storage medium may alternatively be an external storage device of the computer device, for example, a plug-in hard disk, a smart media card (SMC), a secure digital (SD) card, or a flash card on the computer device. Further, the computer-readable storage medium may alternatively include both an internal storage unit and an external storage device of the computer device. The computer-readable storage medium is configured to store the computer program and another program and data that are required by the computer device. The computer-readable storage medium may further be configured to temporarily store data that has been output or is to be output.

In addition, an embodiment of this disclosure also provides a computer program product or computer program. The computer program product or computer program includes computer instructions. The computer instructions are stored in a non-transitory computer-readable storage medium. A processor of a computer device reads the computer instructions from the non-transitory computer-readable storage medium. The processor executes the computer instructions to enable the computer device to perform the method provided in the embodiment corresponding to any one of FIG. 7 and FIG. 12.

The above is only the preferred embodiment of this disclosure and certainly not intended to limit the scope of this application. Therefore, equivalent variations made according to the claims of this application also fall within the scope of this application.

What is claimed is:

1. A data processing method, performed by a computer device, the method comprising:

performing figure acquisition on a first object in response to a login operation in an application client, to obtain an object figure of the first object; and displaying a first virtual object associated with the object figure of the first object, wherein performing figure acquisition on the first object comprises:

displaying a login interface comprising a camera display area in response to a login operation for a first conversation function in the application client, the first conversation function being a conversation function for an instant conversation with an object associated with the first object;

shooting a picture for the first object, and displaying the picture for the first object in the camera display area; and displaying, in the camera display area, a first virtual object matching the picture for the first object;

displaying, in response to the first virtual object entering a virtual conversation space, one or more virtual objects in the virtual conversation space, the one or more virtual objects comprising the first virtual object, and a space figure of the virtual conversation space being associated with the one or more virtual objects, wherein a decoration style of the virtual conversation space matches a figure style of the first virtual object; and displaying, in a conversation display box, a conversation message corresponding to each of the one or more virtual objects in the virtual conversation space, wherein a background color of the conversation display box matches with a figure color of a virtual object transmitting the conversation message, and wherein a transparency level of the conversation display box is determined by a freshness of the conversation message such that a fresher conversation message has a lower transparency level.

2. The method according to claim 1, wherein displaying the first virtual object matching the picture for the first object comprises:

in response to the picture of the first object satisfying a login condition, displaying, in the camera display area, the first virtual object matching the picture for the first object; and wherein the method further comprises:

switching displaying of the login interface to a main application interface, and displaying the first virtual object on the main application interface, an interface design element of the main application interface matching image feature of the first virtual object.

3. The method according to claim 2, wherein the main application interface comprises a conversation selection control, the method further comprising:

displaying an associated object list in response to a trigger operation on the conversation selection control, the associated object list comprising a list of objects in association with the first object; and determining a selected object from the associated object list as a second object in response to a selection operation on the associated object list, and entering, by using the first virtual object, a virtual conversation space associated with the second object, a space figure of the virtual conversation space matching an image feature of a second virtual object, the second virtual object being associated with an object figure of the second object, and the one or more virtual objects further comprising the second virtual object.

4. The method according to claim 3, wherein the associated object list comprises an object display region; the object display region comprises basic object identity information of the selected object and a virtual object corresponding to the selected object; and a display topic of the object display region matching an image feature of the virtual object corresponding to the selected object.

5. The method according to claim 4, wherein the virtual object corresponding to the selected object in the object display region is displayed in a target virtual posture; and wherein the target virtual posture matches a login status of the selected object.

6. The method according to claim 1, wherein the one or more virtual objects comprise a virtual object M; and wherein displaying a conversation message corresponding to the each of the one or more virtual objects in the virtual conversation space comprises:

displaying a conversation message corresponding to the virtual object M in the virtual conversation space by using a conversation display box, a background theme of the conversation display box being matching an image feature of the virtual object M; and displaying the conversation display box in a transparency gradient manner, and canceling displaying of the conversation display box in response to a display duration of the conversation display box reaching a display life cycle.

7. The method according to claim 1, further comprising:

displaying, in response to detecting that a conversation message corresponding to the first virtual object carries an action status mapping text, an animation corresponding to the first virtual object based on a virtual action mapped by the action status mapping text.

8. The method according to claim 1, wherein performing figure acquisition on the first object in response to the login operation and displaying the first virtual object associated with the object figure of the first object comprises:

displaying a conversation element custom list in response to a login operation using a second conversation function in the application client, the second conversation function being a conversation function for an instant conversation with an object not associated with the first object;

displaying a camera display area in response to a configuration operation on the conversation element custom list is completed;

shooting a picture for the first object, and displaying the picture for the first object in the camera display area; and displaying, in the camera display area, a first virtual object matching the picture for the first object and a custom conversation element configured through the configuration operation.

9. The method according to claim 8, further comprising:

determining a configured conversation topic as a target conversation topic in response to a configuration operation on one or more conversation topics in the conversation element custom list;

determining a configured object figure element as a target object figure element in response to a configuration operation on an object figure element in the conversation element custom list; and determining the target conversation topic and the target object figure element as the custom conversation element.

10. The method according to claim 9, further comprising:

configuring, for the first virtual object, virtual clothing matching the target conversation topic; and entering, by using the first virtual object in the virtual clothing, a virtual conversation space associated with the target conversation topic, a space figure of the virtual conversation space being associated with the target conversation topic, and virtual clothing of one or more virtual objects in the virtual conversation space being associated with the target conversation topic.

11. The method according to claim 10, further comprising:

in response to a switching operation on the one or more conversation topics, switching from the target conversation topic to a new conversation topic;

updating and displaying virtual clothing of the first virtual object to be virtual clothing matching the new conversation topic; and switching to a new virtual conversation space associated with the new conversation topic, by using the first virtual object in the virtual clothing.

12. The method according to claim 1, wherein performing the figure acquisition on the first object in response to the login operation and displaying the first virtual object associated with the object figure of the first object comprises:

shooting a picture for the first object in response to a login operation on a conversation function in the application client, to obtain an object image of the first object;

performing recognition and detection on the object image to obtain object figure data of the first object;

determining a target communication account corresponding to the first object based on the object figure data; and displaying, on a login interface in response to the target communication account successfully logging in to the application client, a first virtual object matching the object figure data of the first object and the conversation function.

13. The method according to claim 12, wherein displaying, on the login interface in response to the target communication account successfully logging in to the application client, the first virtual object comprises:

obtaining from a virtual element library, in response to the target communication account successfully logging in to the application client, virtual figure elements matching the picture for the first object; and integrating the virtual figure elements to obtain the first virtual object associated with the object figure of the first object and the conversation function, and displaying the first virtual object on the login interface.

14. The method according to claim 12, wherein the object figure data of the first object comprises key part image data; and determining the target communication account corresponding to the first object based on the object figure data comprises:

traversing an object registration database according to the key part image data, the object registration database being configured to indicate a mapping relationship between key part image data and a communication account; and determining, in response to registered image data similar to the key part image data being found from the object registration database, a communication account mapped to the registered image data similar to the key part image data as the target communication account corresponding to the first object; or generating the target communication account for the key part image data in response to the object registration database not comprising registered image data similar to the key part image data, and storing a mapping relationship between the key part image data and the target communication account to the object registration database.

15. The method according to claim 12, wherein the object figure data of the first object comprises key part image data and one or more pieces of appearance feature data; and wherein determining the target communication account corresponding to the first object based on the object figure data comprises:

traversing an object registration database according to the key part image data, the object registration database comprising a plurality of pieces of registered image data;

obtaining, in response to registered image data similar to the key part image data being found from the object registration database, registered appearance feature data corresponding to the registered image data similar to the key part image data; and determining, in response to the registered appearance feature data being a subset of the one or more pieces of appearance feature data, a communication account mapped to the found registered image data similar to the key part image data as the target communication account corresponding to the first object.

16. The method according to claim 12, further comprising:

extracting image feature information from the object figure data of the first object, and obtaining a target interface design element matching the image feature information;

switching the login interface to an initial main application interface, an interface design element of the initial main application interface being a default interface design element;

updating the default interface design element to the target interface design element on the initial main application interface to obtain a main application interface matching an image feature of the first virtual object; and displaying the first virtual object on the main application interface.

17. The method according to claim 8, wherein displaying, in the camera display area, a first virtual object matching the picture for the first object and a custom conversation element configured through the configuration operation comprises:

performing feature extraction on the picture for the first object to obtain raw object feature data;

obtaining a custom virtual figure corresponding to the custom conversation element configured through the configuration operation, and performing feature extraction on the custom virtual figure to obtain custom feature data;

performing feature fusion on the raw object feature data and the custom feature data to obtain fused feature data; and inputting the fused feature data to an object generator to obtain the first virtual object matching the picture for the first object and the custom conversation element configured through the configuration operation, and displaying the first virtual object.

18. A device comprising a memory for storing computer instructions and a processor in communication with the memory, wherein, when the processor executes the computer instructions, the processor is configured to cause the device to:

perform figure acquisition on a first object in response to a login operation in an application client, to obtain an object figure of the first object; and display a first virtual object associated with the object figure of the first object by:

displaying a login interface comprising a camera display area in response to a login operation for a first conversation function in the application client, the first conversation function being a conversation function for an instant conversation with an object associated with the first object;

shooting a picture for the first object, and displaying the picture for the first object in the camera display area; and displaying, in the camera display area, a first virtual object matching the picture for the first object;

display, in response to the first virtual object entering a virtual conversation space, one or more virtual objects in the virtual conversation space, the one or more virtual objects comprising the first virtual object, and a space figure of the virtual conversation space being associated with the one or more virtual objects, wherein a decoration style of the virtual conversation space matches a figure style of the first virtual object; and display, in a conversation display box, a conversation message corresponding to each of the one or more virtual objects in the virtual conversation space, wherein a background color of the conversation display box matches with a figure color of a virtual object transmitting the conversation message, and wherein a transparency level of the conversation display box is determined by a freshness of the conversation message such that a fresher conversation message has a lower transparency level.

19. A non-transitory storage medium for storing computer readable instructions, the computer readable instructions, when executed by a processor, causing the processor to:
perform figure acquisition on a first object in response to a login operation in an application client, to obtain an object figure of the first object; and display a first virtual object associated with the object figure of the first object by:
displaying a login interface comprising a camera display area in response to a login operation for a first conversation function in the application client, the first conversation function being a conversation function for an instant conversation with an object associated with the first object;
shooting a picture for the first object, and displaying the picture for the first object in the camera display area; and
displaying, in the camera display area, a first virtual object matching the picture for the first object;
display, in response to the first virtual object entering a virtual conversation space, one or more virtual objects in the virtual conversation space, the one or more virtual objects comprising the first virtual object, and a space figure of the virtual conversation space being associated with the one or more virtual objects, wherein a decoration style of the virtual conversation space matches a figure style of the first virtual object; and
display, in a conversation display box, a conversation message corresponding to each of the one or more virtual objects in the virtual conversation space, wherein a background color of the conversation display box matches with a figure color of a virtual object transmitting the conversation message, and wherein a transparency level of the conversation display box is determined by a freshness of the conversation message such that a fresher conversation message has a lower transparency level.

* * * * *